US012628175B2

(12) United States Patent
Wu et al.

(10) Patent No.: US 12,628,175 B2
(45) Date of Patent: May 12, 2026

(54) COMMUNICATION METHOD AND ELECTRONIC EQUIPMENT

(71) Applicant: Samsung Electronics Co., Ltd., Suwon-si (KR)

(72) Inventors: Min Wu, Beijing (CN); Sa Zhang, Beijing (CN); Feifei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 297 days.

(21) Appl. No.: 18/465,461

(22) Filed: Sep. 12, 2023

(65) Prior Publication Data

US 2024/0107547 A1     Mar. 28, 2024

(30) Foreign Application Priority Data

Sep. 28, 2022     (CN) .......................... 202211194412.4

(51) Int. Cl.
*H04W 72/23*          (2023.01)

(52) U.S. Cl.
CPC .................................... *H04W 72/23* (2023.01)

(58) Field of Classification Search
CPC ...................................................... H04W 72/23
USPC .......................................................... 370/329
See application file for complete search history.

(56) References Cited

U.S. PATENT DOCUMENTS

| | | | |
|---|---|---|---|
| 2011/0075624 A1* | 3/2011 | Papasakellariou .... | H04W 48/12 |
| | | | 370/329 |
| 2021/0168774 A1* | 6/2021 | Li ......................... | H04W 16/14 |
| 2022/0264649 A1* | 8/2022 | Lin .................... | H04W 74/0866 |

FOREIGN PATENT DOCUMENTS

WO          2021-259343 A1     12/2021

OTHER PUBLICATIONS

Xiaomi—Remaining issues of PDCCH monitoring adaptation for power saving, 4 pages, dated: Aug. 22, 2022 (Year: 2022).*
International Search Report dated Dec. 12, 2023, issued in International Patent Application No. PCT/KR2023/013622.

(Continued)

*Primary Examiner* — Faruk Hamza
*Assistant Examiner* — Jean F Voltaire
(74) *Attorney, Agent, or Firm* — Jefferson IP Law, LLP

(57)          ABSTRACT

The disclosure relates to a $5^{th}$ generation (5G) or $6^{th}$ generation (6G) communication system for supporting a higher data transmission rate. A communication method and an electronic equipment are provided. The method includes receiving configuration information of periodical physical downlink control channel (PDCCH) monitoring, wherein within each cycle of the configuration comprises a first time window and/or a second time window, and according to the configuration information, performing PDCCH monitoring on type 3 common search space (CSS) and UE-specific search space (USS) in the first time window, and/or, skipping PDCCH monitoring on type 3 CSS and USS in the second time window. By the embodiments of the disclosure, the user equipment (UE) periodically performs PDCCH monitoring and/or skips PDCCH monitoring to achieve the objective of power-saving, and it is avoided that UE cannot timely receive scheduling information to thereby cause data transmission delay.

20 Claims, 15 Drawing Sheets

(56)                References Cited

OTHER PUBLICATIONS

Xiaomi, Remaining issues of PDCCH monitoring adaptation for power saving, R1-2206617, 3GPP TSG RAN WG1 #110, Aug. 12, 2022, Toulouse, France.

Ericsson, Correction for PDCCH skipping during RAR window, R1-2207432, 3GPP TSG RAN WG1 #110, Aug. 12, 2022, Toulouse, France.

Zte et al., Discussion on remaining issues of UE power saving, R1-2207049, 3GPP TSG RAN WG1#110, Aug. 12, 2022, Toulouse, France.

Nokia et al., Open issues on PDCCH monitoring adaptation for UE power saving, R1-2204605, 3GPP TSG RAN WG1 #109-e, Apr. 25, 2022.

* cited by examiner

FIG. 2B

START

Receiving configuration information of periodical PDCCH monitoring window, wherein each cycle of the configuration comprises a first time window and/or a second time window ～S101

According to the configuration information, performing PDCCH monitoring in the first time window, and/or, skipping PDCCH monitoring in the second time window ～S102

END

1

COMMUNICATION METHOD AND ELECTRONIC EQUIPMENT

CROSS-REFERENCE TO RELATED APPLICATION(S)

This application is based on and claims priority under 35 U.S.C. § 119(a) of a Chinese patent application number 202211194412.4, filed on Sep. 28, 2022, in the China National Intellectual Property Administration, the disclosure of which is incorporated by reference herein in its entirety.

BACKGROUND

1. Field

The disclosure relates to a technical field of radio communication. More particularly, the disclosure relates to a communication method and an electronic equipment.

2. Description of Related Art $5^{th}$ generation (5G) mobile communication technologies define broad frequency bands such that high transmission rates and new services are possible, and can be implemented not only in "Sub 6 GHz" bands, such as 3.5 GHz, but also in "Above 6 GHz" bands referred to as mmWave including 28 GHz and 39 GHz. In addition, it has been considered to implement $6^{th}$ generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multiple input-multiple output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods, such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies, such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR user equipment (UE) power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies, such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEG) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies, such as full dimensional MIMO (FD-MIMO), array antennas and large-scale antennas, meta-material-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and artificial intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and an electronic equipment.

Additional aspects will be set forth in part in the description which follows and, in part, will be apparent from the description, or may be learned by practice of the presented embodiments.

In accordance with an aspect of the disclosure, a method performed by a UE in a communication system is provided. The method includes receiving configuration information of periodical physical downlink control channel (PDCCH) monitoring, wherein each cycle of the configuration information comprises a first time window and/or a second time window, and according to the configuration information, performing PDCCH monitoring on type 3 common search space (CSS) and UE-specific search space (USS) in the first time window, and/or, skipping PDCCH monitoring on type 3 CSS and USS in the second time window.

Optionally, the configuration information includes at least one of the following information, period, a length of the first time window, a length of the second time window, a starting position of the first time window, and a starting position of the second time window.

Optionally, receiving configuration information of periodical PDCCH monitoring includes at least one of the following circumstances, receiving UE-specific radio resource control (RRC) signaling for indicating the configuration information, and receiving UE-specific RRC signaling for indicating the configuration information, and receiving downlink control information (DCI) for activating the configuration information, wherein the starting position of the first time window or the second time window is a position of a first preset interval after the corresponding DCI has been received.

Optionally, receiving configuration information of periodical PDCCH monitoring includes receiving at least two pieces of configuration information of periodical PDCCH monitoring, according to the configuration information, performing PDCCH monitoring on type 3 CSS and USS in the first time window, and/or, skipping PDCCH monitoring on type 3 CSS and USS in the second time window includes, according to at least two configuration information, respectively performing PDCCH monitoring on type 3 CSS and USS in the respective first time window, and/or, skipping PDCCH monitoring on type 3 CSS and USS in the respective second time window.

Optionally, when at least one configuration of at least two configurations is in the first time window, PDCCH monitoring is performed, and/or when the at least two configurations are both in the second time window, PDCCH monitoring is skipped.

Optionally, the at least two pieces of configuration information are respectively employed for one of the following circumstances, different data services, different service cells, wherein the at least two pieces of configuration information respectively contain index numbers of corresponding service cells, different service cell groups, wherein the at least two pieces of configuration information respectively contain index numbers of corresponding service cell groups, different search spaces, wherein the at least two pieces of configuration information respectively contain index numbers of corresponding search spaces, different search space groups, wherein the at least two pieces of configuration information respectively contain index numbers of corresponding search space groups, and at least one of type 1 CSS, type 2 CSS, type 3 CSS, and USS.

In accordance with another aspect of the disclosure, a method performed by a UE in a communication system is provided. The method includes monitoring DCI for indicating relevant information of PDCCH monitoring, and based on the DCI, performing PDCCH monitoring or skipping PDCCH monitoring.

Optionally, the DCI includes at least one of the following indication fields, an indication field for indicating a PDCCH monitoring window, wherein a starting position of the PDCCH monitoring window is a position of a second preset interval after the DCI has been detected, and PDCCH monitoring is performed in the PDCCH monitoring window, an indication field for indicating to early terminate a PDCCH monitoring window, wherein a progressing PDCCH monitoring window is terminated at a position of a third preset interval after the DCI has been detected, an indication field for indicating to start PDCCH monitoring, wherein PDCCH monitoring is started at a position of a fourth preset interval after the DCI has been detected, an indication field for indicating to start search space or search space group of PDCCH monitoring, wherein PDCCH monitoring is started on the corresponding search space or search space group at a position of a fifth preset interval after the DCI has been detected, an indication field for indicating a PDCCH skipping window, wherein a starting position of the PDCCH skipping window is a position of a sixth preset interval after the DCI has been detected, and PDCCH monitoring is skipped in the PDCCH skipping window, an indication field for indicating to early terminate the PDCCH skipping window, wherein a progressing PDCCH skipping window is terminated at a position of a seventh preset interval after the DCI has been detected, an indication field for indicating to stop PDCCH monitoring, wherein PDCCH monitoring is stopped at a position of an eighth preset interval after the DCI has been detected, an indication field for indicating a search space or a search space group wherein PDCCH monitoring will be stopped, wherein PDCCH monitoring on the corresponding search space or search space group is stopped at a position of a ninth preset interval after the DCI has been detected, an indication field for indicating an aggregation level or an aggregation level set of candidate PDCCHs to which at least one search space corresponds respectively, and an indication field for indicating numbers of candidate PDCCHs respectively for one or more aggregation level(s) to which at least one search space corresponds respectively.

Optionally, the length of the PDCCH monitoring window is indicated by UE-specific radio resource control RRC signaling and/or the DCI, and/or the length of PDCCH skipping window is indicated by UE-specific RRC signaling and/or the DCI.

Optionally, the DCI is a DCI employed to schedule PDSCH or PUSCH, or the DCI is a UE group common DCI.

Optionally, the UE group common DCI includes a plurality of information blocks that correspond to different UEs.

Optionally, starting positions of the information blocks to which UEs correspond are preconfigured in the UE group common DCI.

Optionally, monitoring DCI for indicating relevant information of PDCCH monitoring includes monitoring the UE group common DCI under at least one of the following circumstances, starting to monitor the UE group common DCI after having received high-layer signaling for activating the UE group common DCI, monitoring the UE group common DCI in a duration of the PDCCH skipping window, monitoring the UE group common DCI from the starting position of a discontinuous reception (DRX) period, monitoring the UE group common DCI in non-activation time of the DRX and/or, stopping monitoring the UE group common DCI under at least one of the following circumstances, stopping monitoring the UE group common DCI after having received high-layer signaling for de-activating the UE group common DCI, stopping monitoring the UE group common DCI when the UE group common DCI is detected and the UE group common DCI indicates to start PDCCH monitoring, and stopping monitoring the UE group common DCI after the UE group common DCI has been continuously monitored for a preset duration.

Optionally, monitoring the UE group common DCI from the starting position of a DRX cycle includes, from the starting position of the DRX cycle, skipping PDCCH monitoring on type 3 CSS and USS, and monitoring the UE group common DCI, if the UE group common DCI is detected and the UE group common DCI indicates to start PDCCH monitoring, then starting PDCCH monitoring on type 3 CSS and USS.

Optionally, monitoring the UE group common DCI from the starting position of a DRX cycle further includes at least one of the following circumstances, starting a on duration timer of the DRX when the UE group common DCI is detected and the UE group common DCI indicates to start PDCCH monitoring, and stopping monitoring the UE group common DCI after the on duration timer of the DRX has stopped running.

In accordance with another aspect of disclosure, a method performed by a UE in a communication system is provided. The method includes triggering a buffer status report (BSR), with respect to a pending BSR, transmitting a scheduling request (SR) or the BSR to a base station through at least one of the following modes, transmitting an SR on the earliest SR resource among at least one SR resource, transmitting an SR on an SR resource preconfigured for the BSR, transmitting the BSR on a PUCCH resource preconfigured for the BSR, and initiating a random access process on a physical random access channel (PRACH) resource to request for resource scheduling.

Optionally, the BSR corresponds to at least one of the following circumstances, a predefined or preconfigured logic channel, a predefined or preconfigured logic channel group, a data packet of preset service, a data packet whose data packet delay budget PDB requirement is lower than a first threshold value, and a data packet whose remaining PDB value is lower than a second threshold value.

Optionally, the at least one SR resource is an SR resource configured for any SR configuration, or the at least one SR resource is at least one of an SR resource preconfigured for the BSR, an SR resource preconfigured for a logic channel to which the BSR corresponds, an SR preconfigured for other logic channels than the logic channel to which the BSR corresponds, an SR resource configured for secondary cell beam failure recovery, and an SR resource configured for consistent Listen Before Talk LBT failure recovery.

Optionally, initiating a random access process on a PRACH resource to request for resource scheduling includes, if the earliest available SR resource is after the earliest available PRACH resource, then initiating the random access process on the earliest available PRACH resource to request for resource scheduling, if the earliest available SR resource is after the earliest available PRACH resource, and the available PRACH request is preconfigured for the BSR, then initiating the random access process on the earliest available PRACH resource to request for resource scheduling, and if there is no available SR resource, initiating the random access process on the PRACH resource preconfigured for the BSR to request for resource scheduling.

In accordance with another aspect of the disclosure, a method performed by a base station in a communication system is provided. The method includes transmitting, to a UE, configuration information of periodical PDCCH monitoring, wherein each cycle of the configuration information comprises a first time window and/or a second time window, and based on the configuration information, transmitting a PDCCH of the UE on type 3 CSS and USS of the UE in the first time window, and/or not transmitting a PDCCH of the UE on type 3 CSS and USS of the UE in the second time window.

Optionally, the configuration information includes at least one of the following information, a period, a length of the first time window, a length of the second time window, a starting position of the first time window, and a starting position of the second time window.

Optionally, transmitting configuration information of periodical PDCCH monitoring to the UE includes at least one of the following circumstances, transmitting UE-specific RRC signaling for indicating configuration information to the UE, and transmitting UE-specific RRC signaling for indicating configuration information to the UE, and transmitting DCI for activating configuration information to the UE, wherein the starting position of the first time window or the second time window is a position of a first preset interval after the corresponding DCI has been received.

Optionally, transmitting configuration information of the periodical PDCCH monitoring window to the UE includes transmitting at least two pieces of configuration information of the periodical PDCCH monitoring window to the UE, based on the configuration information, transmitting a PDCCH of the UE on type 3 CSS and USS of the UE in the first time window, and/or, not transmitting a PDCCH of the UE on type 3 CSS and USS of the UE in the second time window includes, based on the at least two pieces of configuration information, transmitting the PDCCH of the UE on type 3 CSS and USS of the UE in respective first time window, and/or, not transmitting the PDCCH of the UE on type 3 CSS and USS of the UE in respective second time window.

Optionally, the at least two pieces of configuration information are respectively employed for one of the following circumstances, different data services, different service cells, different service cell groups, different search spaces, different search space groups, and at least one of type 1 CSS, type 2 CSS, type 3 CSS, and USS.

In accordance with another aspect of the disclosure, a method performed by a base station in a communication system is provided. The method includes transmitting, to a UE, DCI for indicating relevant information of PDCCH monitoring, and based on the relevant information of PDCCH monitoring, transmitting or not transmitting the PDCCH to the UE.

Wherein, the DCI includes at least one of the following indication fields, an indication field for indicating a PDCCH monitoring window, wherein a starting position of the PDCCH monitoring window is a position of a second preset interval after the DCI has been detected, and PDCCH monitoring is performed in the PDCCH monitoring window, an indication field for indicating to early terminate a PDCCH monitoring window, wherein a progressing PDCCH monitoring window is terminated at a position of a third preset interval after the DCI has been detected, an indication field for indicating to start PDCCH monitoring, wherein PDCCH monitoring is started at a position of a fourth preset interval after the DCI has been detected, an indication field for indicating to start search space or search space group of PDCCH monitoring, wherein PDCCH monitoring is started on the corresponding search space or search space group at a position of a fifth preset interval after the DCI has been detected, an indication field for indicating a PDCCH skipping window, wherein a starting position of the PDCCH skipping window is a position of a sixth preset interval after the DCI has been detected, and PDCCH monitoring is skipped in the PDCCH skipping window, an indication field for indicating to early terminate the PDCCH skipping window, wherein a progressing PDCCH skipping window is terminated at a position of a seventh preset interval after the DCI has been detected, an indication field for indicating to stop the PDCCH monitoring, wherein PDCCH monitoring is stopped at a position of an eighth preset interval after the DCI has been detected, an indication field for indicating a search space or a search space group wherein PDCCH monitoring will be stopped, wherein PDCCH monitoring on the corresponding search space or search space group is stopped at a position of a ninth preset interval after the DCI has been detected, an indication field for indicating an aggregation level or a set of aggregation level for candidate PDCCHs to which at least one search space corresponds respectively, and an indication field for indicating numbers of candidate PDCCHs respectively for one or more aggregation level(s) to which at least one search space corresponds respectively.

Optionally, the length of the PDCCH monitoring window is indicated by UE-specific RRC signaling and/or the DCI, and/or the length of the PDCCH skipping window is indicated by UE-specific RRC signaling and/or the DCI.

Optionally, the DCI is a DCI employed to schedule PDSCH or PUSCH, or the DCI is a UE group common DCI.

Optionally, the UE group common DCI includes a plurality of information blocks that correspond to different UEs.

Optionally, starting positions of the information blocks to which UEs correspond are preconfigured in the UE group common DCI.

In accordance with another aspect of the disclosure, an electronic equipment is provided. The electronic equipment includes a transceiver, configured to transmit and receive signals, and a processor, coupled with the transceiver and configured to execute the method performed by the UE provided by the embodiments of the disclosure.

In accordance with another aspect of the disclosure, an electronic equipment is provided. The electronic equipment includes a transceiver, configured to transmit and receive signals, and a processor, coupled with the transceiver and configured to execute the method performed by the base station provided by the embodiments of the disclosure.

In accordance with another aspect of the disclosure, a computer readable storage medium is provided. The computer readable storage medium includes storing thereon a computer program that, when executed by a processor, realizes the method performed by the UE provided by the embodiments of the disclosure.

In accordance with another aspect of the disclosure, a computer readable storage medium is provided. The computer readable storage medium includes storing thereon a computer program that, when executed by a processor, realizes the method performed by the base station provided by the embodiments of the disclosure.

In accordance with another aspect of the disclosure, a computer program product is provided. The computer program product includes a computer program that, when executed by a processor, realizes the method performed by the UE provided by the embodiments of the disclosure.

In accordance with another aspect of the disclosure, a computer program product is provided. The computer program product includes a computer program that, when executed by a processor, realizes the method performed by the base station provided by the embodiments of the disclosure.

By the communication methods and electronic equipments provided by the embodiments of the disclosure, the UE monitors the PDCCH in a periodical monitoring window, wherein each cycle includes a monitoring window and a time window for not monitoring PDCCH, that is to say, the objective of power-saving can be achieved by the UE periodically performing PDCCH monitoring and/or skipping PDCCH monitoring, and it is avoided that UE cannot timely receive scheduling information to thereby cause data transmission delay.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2B is a schematic diagram of a reception path according to an embodiment of the disclosure;

Throughout the drawings, it should be noted that like reference numbers are used to depict the same or similar elements, features, and structures.

DETAILED DESCRIPTION

Figure 1:
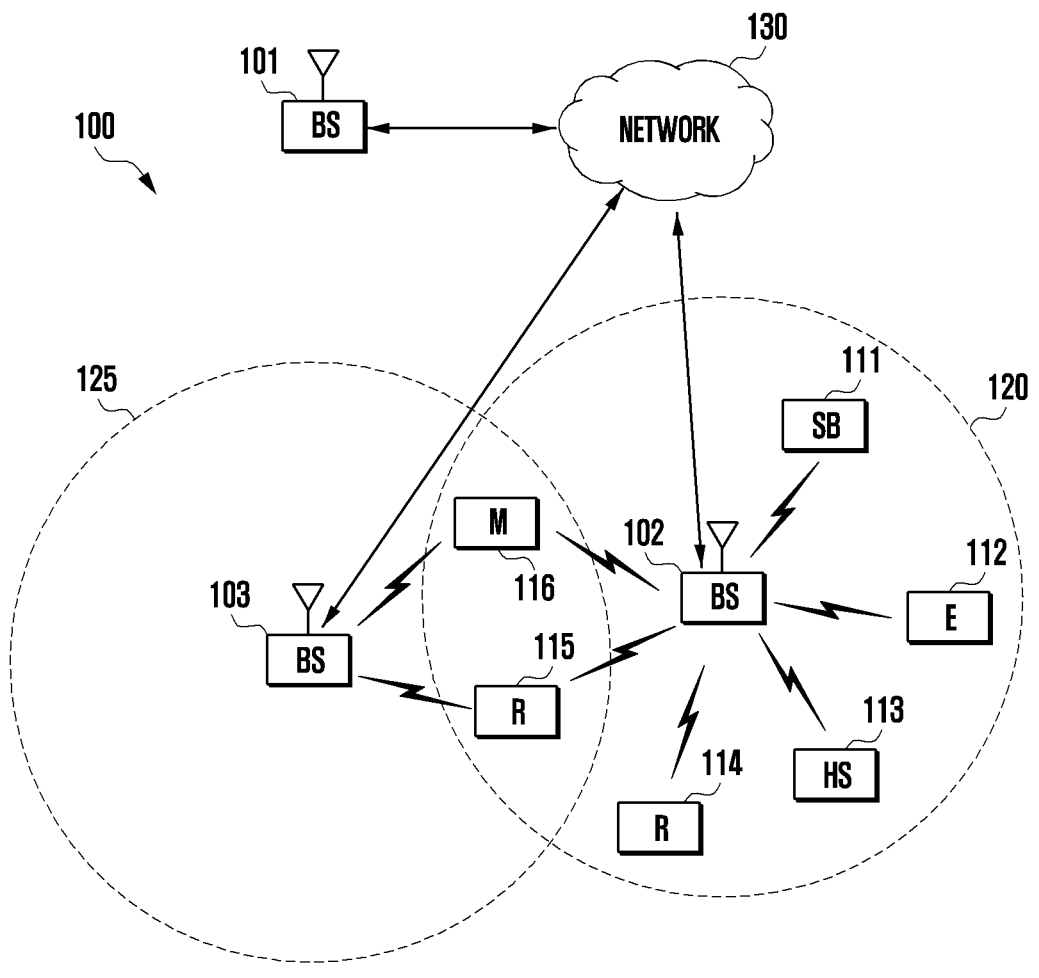
FIG. 1 is a schematic diagram of a radio network overall structure according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include" or "may include" refers to the existence of a corresponding disclosed function, operation or component which can be used in various embodiments of the disclosure and does not limit one or more additional functions, operations, or components. The terms, such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the disclosure includes any or all of combinations of listed words. For example, the expression "A or B" may include A, may include B, or may include both A and B.

Unless defined differently, all terms used herein, which include technical terminologies or scientific terminologies, have the same meaning as that understood by a person skilled in the art to which the disclosure belongs. Such terms as those defined in a generally used dictionary are to be interpreted to have the meanings equal to the contextual meanings in the relevant field of art, and are not to be interpreted to have ideal or excessively formal meanings unless clearly defined in the disclosure.

To make more lucid and clear the objectives, technical solutions and advantages of the disclosure, embodiments of the disclosure will be described below in conjunction with the accompanying drawings.

The text and the drawings are merely provided as examples to help readers comprehend the disclosure. They should not be explained as restricting the scope of the disclosure in any way. Although certain embodiments and examples have been provided, based on the contents disclosed by this Description, it is obvious to persons skilled in the art that the illustrated embodiments and examples can be altered without departing from the scope of the disclosure.

In order to meet the increasing demand for wireless data communication services since the deployment of 4G communication systems, efforts have been made to develop improved 5G or pre-5G communication systems. Therefore, 5G or pre-5G communication systems are also called "Beyond 4G networks" or "Post-LTE systems".

In order to achieve a higher data rate, 5G communication systems are implemented in higher frequency (millimeter, mmWave) bands, e.g., 60 GHz bands. In order to reduce propagation loss of radio waves and increase a transmission distance, technologies, such as beamforming, massive multiple-input multiple-output (MIMO), full-dimensional MIMO (FD-MIMO), array antenna, analog beamforming and large-scale antenna are discussed in 5G communication systems.

In addition, in 5G communication systems, developments of system network improvement are underway based on advanced small cell, cloud radio access network (RAN), ultra-dense network, device-to-device (D2D) communication, wireless backhaul, mobile network, cooperative communication, coordinated multi-points (CoMP), reception-end interference cancellation, or the like.

In 5G systems, hybrid FSK and QAM modulation (FQAM) and sliding window superposition coding (SWSC) as advanced coding modulation (ACM), and filter bank multicarrier (FBMC), non-orthogonal multiple access (NOMA) and sparse code multiple access (SCMA) as advanced access technologies have been developed.

Power-saving technology has always been an important design target in the communication system, particularly of great importance is the power-saving technology at the user equipment (UE) side, but the current power-saving technology at the UE side leaves something to be desired.

FIG. 1 illustrates a wireless network according to an embodiment of the disclosure. The embodiment of a wireless network 100 shown in FIG. 1 is for illustration only. Other embodiments of the wireless network 100 can be used without departing from the scope of the disclosure.

Referring to FIG. 1, the wireless network 100 includes a gNodeB (gNB) 101, a gNB 102, and a gNB 103. gNB 101 communicates with gNB 102 and gNB 103. gNB 101 also communicates with at least one Internet protocol (IP) network 130, such as the Internet, a private IP network, or other data networks.

Depending on a type of the network, other well-known terms, such as "base station" or "access point" can be used instead of "gNodeB" or "gNB". For convenience, the terms "gNodeB" and "gNB" are used in this patent document to refer to network infrastructure components that provide wireless access for remote terminals. And, depending on the type of the network, other well-known terms, such as "mobile station", "user station", "remote terminal", "wireless terminal" or "user apparatus" can be used instead of "user equipment" or "UE". For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the IP network 130 for a first plurality of user equipment (UEs) within a coverage area 120 of gNB 102. The first plurality of UEs include a UE 111, which may be located in a small business (SB), a UE 112, which may be located in an enterprise (E); a UE 113, which may be located in a wi-fi hotspot (HS), a UE 114, which may be located in a first residence (R), a UE 115, which may be located in a second residence (R), a UE 116, which may be a mobile device (M), such as a cellular phone, a wireless laptop computer, a wireless PDA, or the like. GNB 103 provides wireless broadband access to the IP network 130 for a second plurality of UEs within a coverage area 125 of gNB 103. The second plurality of UEs include a UE 115 and a UE 116. In some embodiments of the disclosure, one or more of gNBs 101-103 can communicate with each other and with UEs 111-116 using 5G, long term evolution (LTE), LTE advanced (LTE-A), worldwide interoperability for microwave access (WiMAX) or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described below, one or more of gNB 101, gNB 102, and gNB 103 include a 2D antenna array as described in embodiments of the disclosure. In some embodiments of the disclosure, one or more of gNB 101, gNB 102, and gNB 103 support codebook designs and structures for systems with 2D antenna arrays.

Although FIG. 1 illustrates a wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the IP network 130 for those UEs. Similarly, each gNB 102-103 can directly communicate with the IP network 130 and provide direct wireless broadband access to the IP network 130 for the UEs. In addition, gNB 101, 102 and/or 103 can provide access to other or additional external networks, such as external telephone networks or other types of data networks.

Figure 2A:
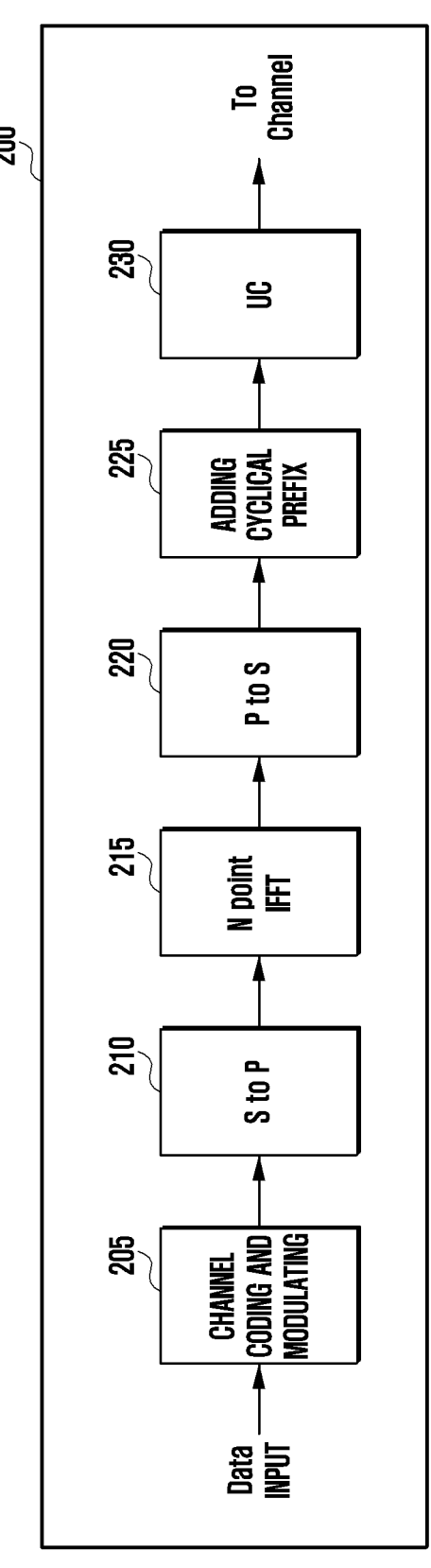
FIG. 2A is a schematic diagram of a transmission path according to an embodiment of the disclosure.
Figure 2B:
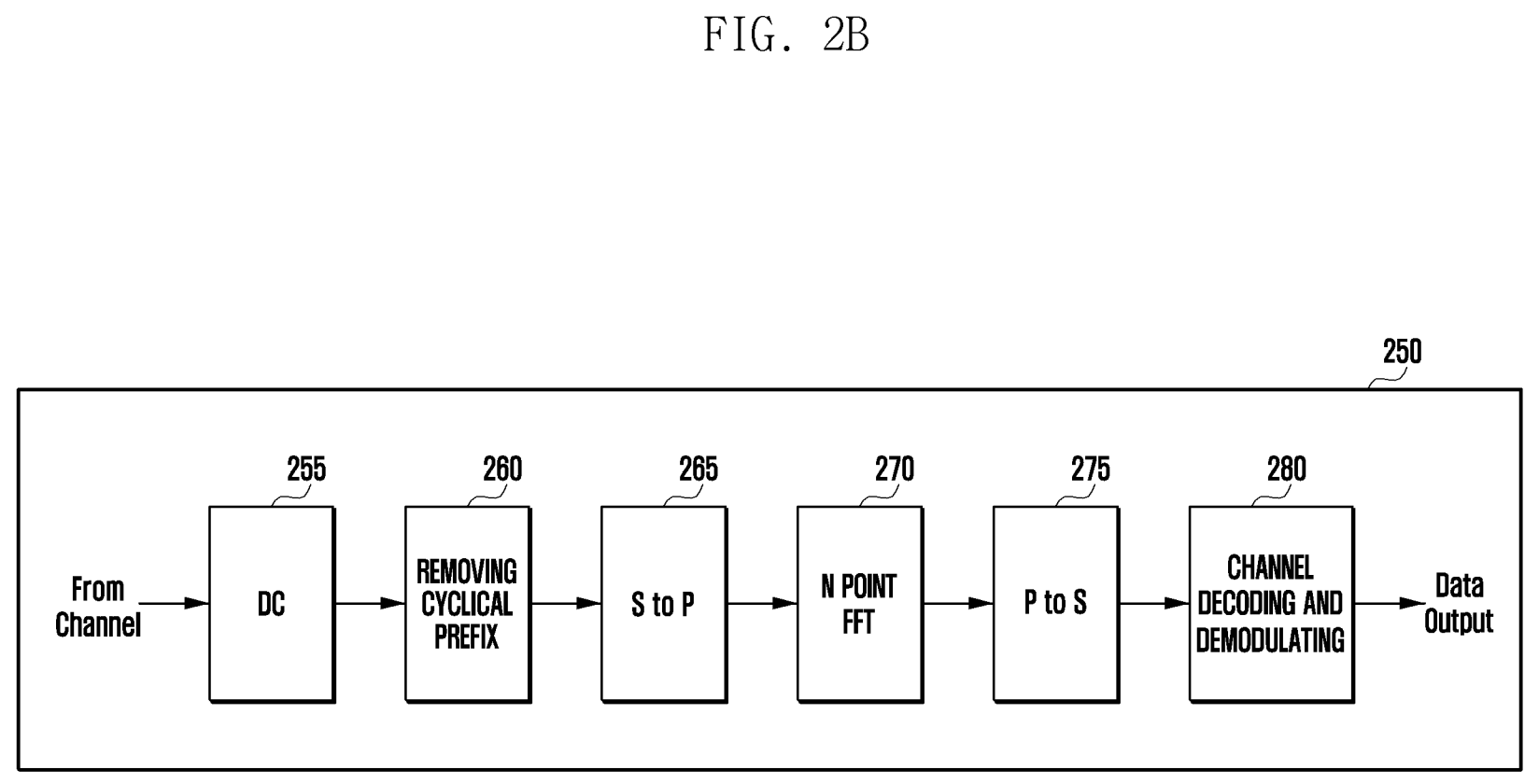

FIGS. 2A and 2B illustrate wireless transmission and reception paths according to various embodiments of the disclosure.

Referring to FIGS. 2A and 2B, a transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments of the disclosure, the reception path 250 is configured to support codebook designs and structures for systems with 2D antenna arrays as described in embodiments of the disclosure.

The transmission path 200 includes a channel coding and modulation block 205, a serial-to-parallel (S-to-P) block 210, a size N inverse fast Fourier transform (IFFT) block 215, a parallel-to-serial (P-to-S) block 220, a cyclic prefix addition block 225, and an up-converter (UC) 230. The reception path 250 includes a down-converter (DC) 255, a cyclic prefix removal block 260, a serial-to-parallel (S-to-P) block 265, a size N fast Fourier transform (FFT) block 270, a parallel-to-serial (P-to-S) block 275, and a channel decoding and demodulation block 280.

In the transmission path 200, the channel coding and modulation block 205 receives a set of information bits, applies coding (such as low density parity check (LDPC) coding), and modulates the input bits (such as using quadrature phase shift keying (QPSK) or quadrature amplitude modulation (QAM)) to generate a sequence of frequency-domain modulated symbols. The serial-to-parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The parallel-to-serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The serial-to-parallel block 265 converts the time-domain baseband signal into a parallel time-domain signal. The Size N FFT block 270 performs an FFT algorithm to generate N parallel frequency-domain signals. The parallel-to-serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the disclosure. Other types of transforms can be used, such as discrete Fourier transform (DFT) and inverse discrete Fourier transform (IDFT) functions. It should be understood that for DFT and IDFT functions, the value of variable N may be any integer (such as 1, 2, 3, 4, or the like), while for FFT and IFFT functions, the value of variable N may be any integer which is a power of 2 (such as 1, 2, 4, 8, 16, or the like).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
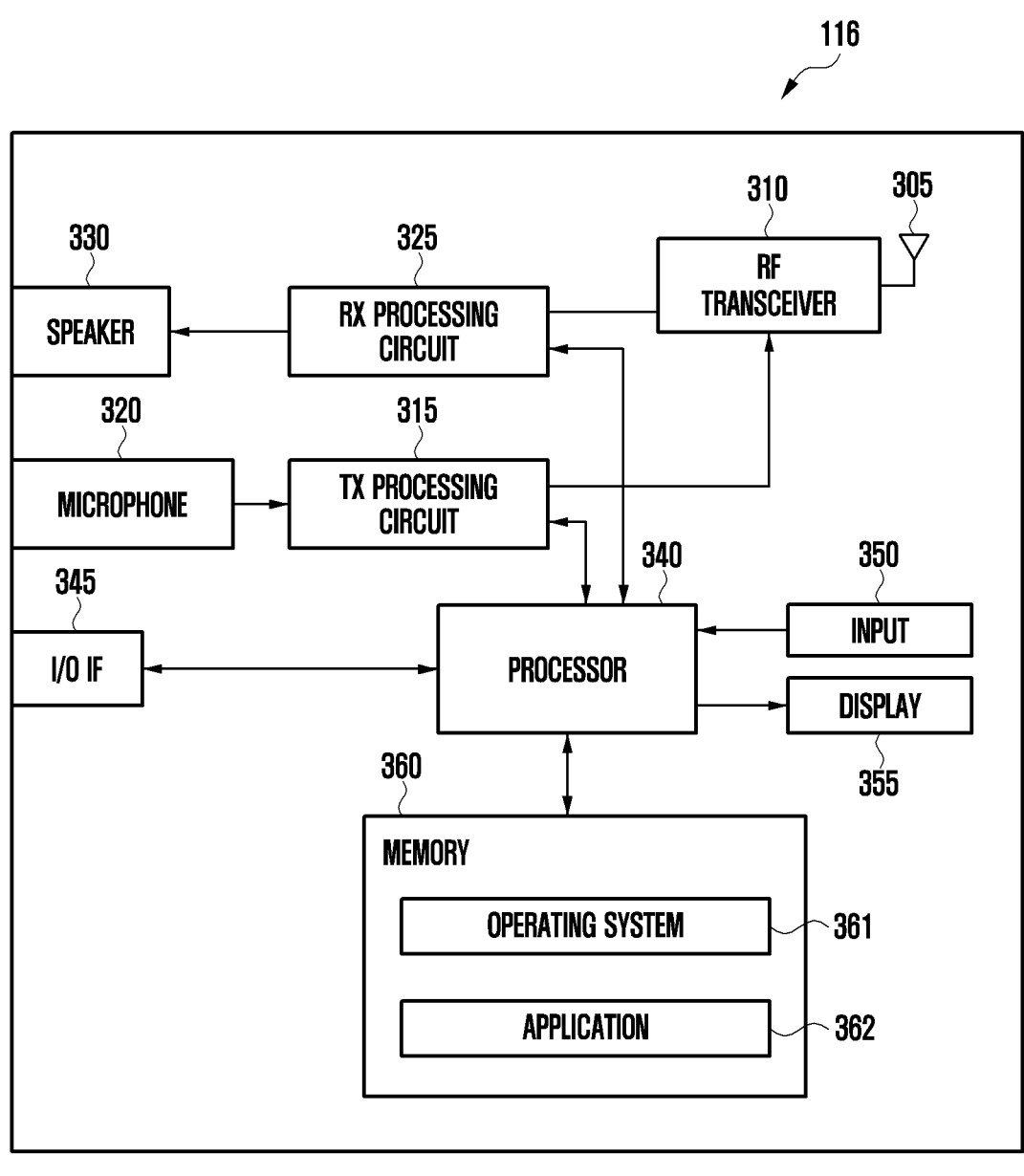
FIG. 3A is a schematic diagram of a structure of a user equipment (UE) according to an embodiment of the disclosure.

FIG. 3A illustrates an example UE 116 according to an embodiment of the disclosure. The embodiment of UE 116 shown in FIG. 3A is for illustration only, and UEs 111-115 of FIG. 1 can have the same or similar configuration. However, a UE has various configurations, and FIG. 3A does not limit the scope of the disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments of the disclosure, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the disclosure. The processor/controller 340 can move data into or out of the memory 360 as required by an execution process. In some embodiments of the disclosure, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices, such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
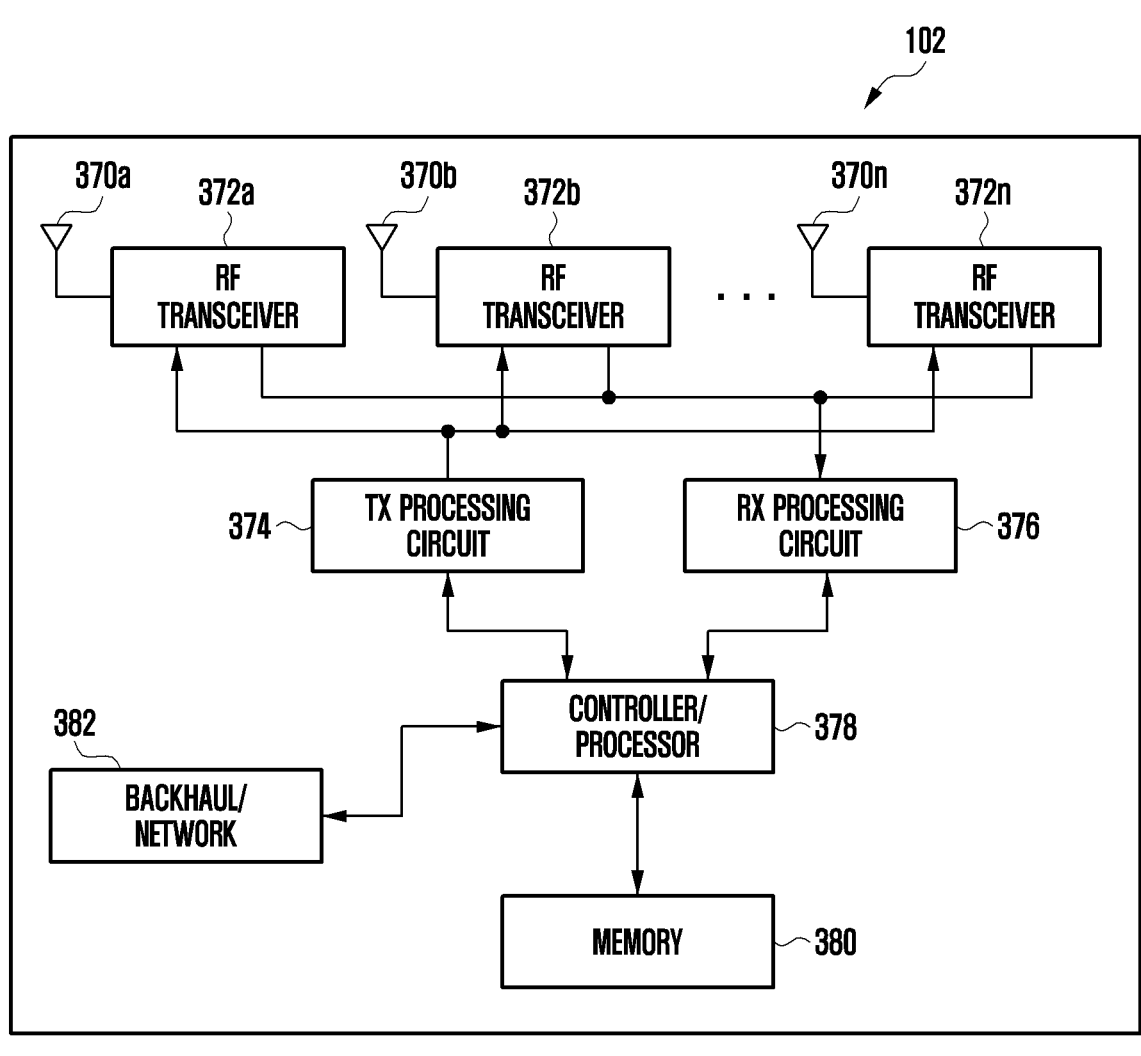
FIG. 3B is a schematic diagram of a structure of a base station according to an embodiment of the disclosure.

FIG. 3b illustrates an example gNB 102 according to an embodiment of the disclosure. The embodiment of gNB 102 shown in FIG. 3B is for illustration only, and other gNBs of FIG. 1 can have the same or similar configuration. However, a gNB has various configurations, and FIG. 3B does not limit the scope of the disclosure to any specific implementation of a gNB. It should be noted that gNB 101 and gNB 103 can include the same or similar structures as gNB 102.

Referring to FIG. 3B, gNB 102 includes a plurality of antennas 370a-370n, a plurality of RF transceivers 372a-372n, a transmission (TX) processing circuit 374, and a reception (RX) processing circuit 376. In certain embodiments of the disclosure, one or more of the plurality of antennas 370a-370n include a 2D antenna array. gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a blind interference sensing (BIS) process, such as that performed through a BIS algorithm, and decode a received signal from which an interference signal is subtracted. A controller/processor 378 may support any of a variety of other functions in gNB 102. In some embodiments of the disclosure, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the disclosure. In some embodiments of the disclosure, the controller/processor 378 supports communication between entities, such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments of the disclosure, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described below, the transmission and reception paths of gNB 102 (implemented using RF transceivers 372a-372n, TX processing circuit 374 and/or RX processing circuit 376) support aggregated communication with FDD cells and TDD cells.

Although FIG. 3B illustrates an example of gNB 102, various changes may be made to FIG. 3B. For example, gNB 102 can include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

In the LTE and new radio (NR) communication systems, one important power-saving technology is the discontinuous reception technology. For instance, under the RRC connected mode, the UE accords with the DRX configuration to start the drx-On duration timer at each DRX cycle. If the UE detects a new data scheduling, then a drx-inactivity timer is further started. In addition, it is also possible to start respective drx-retransmission timer for each hybrid automatic repeat request (HARQ) process. As long as anyone of the drx-On duration timer, drx-inactivity timer and drx-retransmission timer is running, it is required for the UE to monitor the PDCCH, otherwise the UE stops the PDCCH monitoring. Since the PDCCH monitoring is the most power-consuming operation of the UE, the DRX mechanism controls the PDCCH monitoring behavior of the UE through the timer, so as to achieve the objective of power-saving, but the power-saving technology is still to be consummated.

The communication method and electronic equipment provided by the embodiments of the disclosure can provide more dynamic PDCCH monitoring mechanism. In addition, it can further provide a PDCCH monitoring mechanism that is more adapted to the service characteristics.

Figure 4:
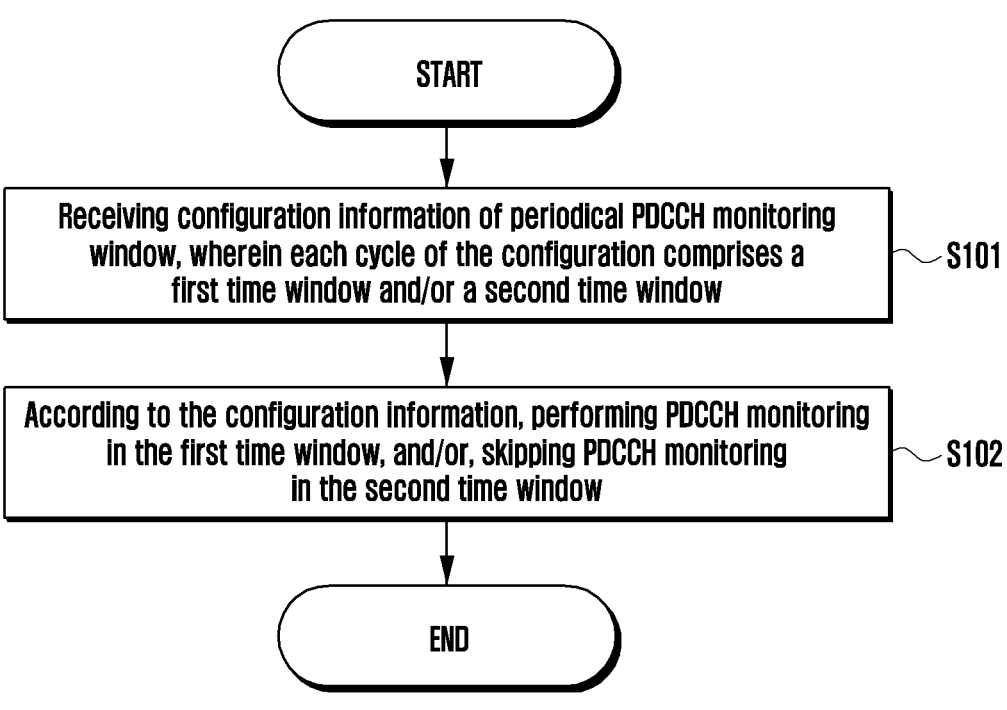
FIG. 4 is a schematic diagram of a flow of a method performed by a UE according to an embodiment of the disclosure.

FIG. 4 is a schematic diagram of a flow of a method performed by a UE according to an embodiment of the disclosure.

Referring to FIG. 4, there is provided a method performed by a user equipment UE in a communication system in an embodiment of the disclosure, as shown in FIG. 4, the method comprises the following:

Operation S101: receiving configuration information of periodical PDCCH monitoring, wherein each cycle of the configuration information includes a first time window and/or a second time window; and Operation S102: according to the configuration information, performing PDCCH monitoring in the first time window, and/or, skipping PDCCH monitoring in the second time window.

Specifically, according to the configuration information, PDCCH monitoring can be performed on type 3 CSS and USS in the first time window, and/or, skipped on type 3 CSS and USS in the second time window.

In the embodiments of the disclosure, the UE periodically performs the PDCCH monitoring in a first duration (that is, the first time window, and can also be referred to as first time length or first time duration, or the like) and/or skips the PDCCH in a second duration (that is, the second time window, and can also be referred to as second time length or second time duration, or the like). For example, the UE monitors the PDCCH in the first duration of each cycle, and skips the PDCCH monitoring in the second duration of each cycle.

In the embodiments of the disclosure, the objective of power-saving is achieved by the UE periodically performing the PDCCH monitoring and/or skipping the PDCCH monitoring, and it is avoided that UE cannot timely receive scheduling information to thereby cause data transmission delay.

Figure 5:
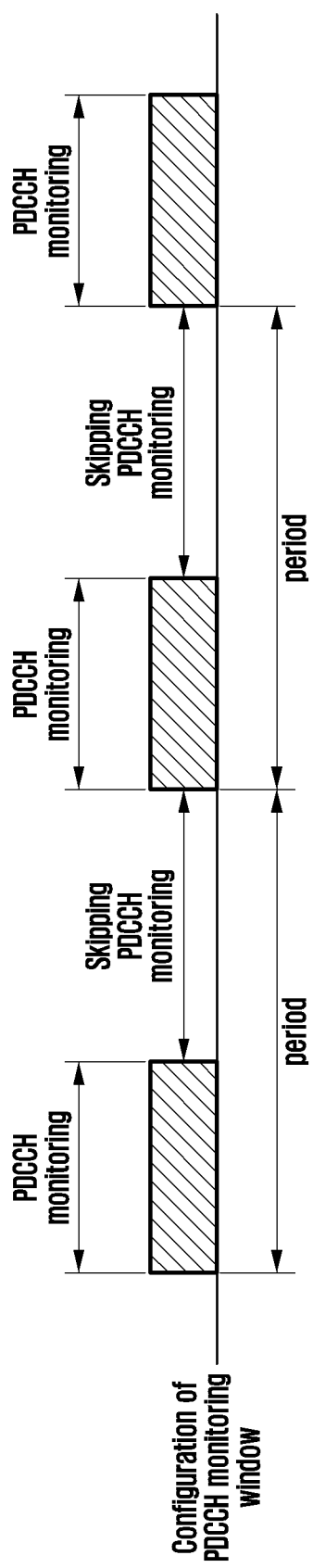
FIG. 5 is a schematic diagram of a PDCCH monitoring window configuration according to an embodiment of the disclosure.

FIG. 5 is a schematic diagram of a PDCCH monitoring window configuration according to an embodiment of the disclosure.

Referring to FIG. 5, as regards the embodiments of the disclosure, the configuration of the PDCCH monitoring window has periodicity. As an example, as shown in FIG. 5, each cycle includes two durations, the first time window in the cycle is the PDCCH monitoring window, and corresponds to the PDCCH monitoring status of the UE, and the second time window in the cycle is the PDCCH (monitoring) skipping window, and corresponds to the PDCCH monitoring skipping status of the UE.

Specifically, it is required for the UE to monitor Type 3 CSS and USS in the first time window, this is so because Type 3 CSS and USS are search spaces for scheduling unicast data or transmitting relevant control information, while Type 1 CSS and Type 2 CSS are search spaces for scheduling broadcast or multicast data, irrelevant to the unicast data service of the UE, and not affected by PDCCCH monitoring window configuration. The base station can configure the matched PDCCH monitoring window according to data service characteristics of the UE. By the same token, the UE can skip the PDCCH monitoring of Type 3 CSS and USS in the second time window, but may monitor Type 1 CSS and/or Type 2 CSS. In actual operation, a large number of search spaces will be configured as Type 3 CSS and USS to enhance the flexibility of data scheduling, while only a small number of search spaces will be configured as Type 1 CSS and Type 2 CSS, accordingly, the power-saving objective can be effectively achieved by controlling the PDCCH monitoring on Type 3 CSS and USS of the UE based on data service characteristics.

In the embodiments of the disclosure, the configuration information of the PDCCH monitoring includes at least one of the following information: period, a length of the first time window, a length of the second time window, a starting (time domain) position of the first time window, and a starting (time domain) position of the second time window.

Optionally, the period and the starting position of the first time window are jointly indicated, and/or, the period and the starting position of the second time window are jointly indicated, wherein being jointly indicated means being indicated by a same parameter.

Then in some embodiments of the disclosure, the configuration of the first time window and the configuration of the second time window can be understood as the same configuration. For instance, the configuration of the first time window includes a period, a length of the first time window, and a starting position of the first time window, based on these configurations of the first time window, the length of the second time window, and the starting position of the second time window, or the like, can be obtained. Alternatively, the configuration of the second time window includes a period, a length of the second time window, and a starting time domain position of the second time window, based on these configurations of the second time window, the length of the first time window, and the starting position of the first time window, or the like, can be obtained.

In the embodiments of the disclosure, the behavior of the UE under the PDCCH monitoring window configuration is controlled by the physical layer (control information), and this is different from the PDCCH monitoring behavior controlled by the DRX mechanism of the medium access control (MAC) layer, in the DRX active time, the MAC layer controls the UE to monitor PDCCH search spaces of all configurations, whereas in the DRX non-active time, the MAC layer controls the UE to stop the PDCCH monitoring on all PDCCH search spaces. In the above first time window, the physical layer controls the UE to monitor Type 3 CSS and USS, in the above second time window, the physical layer controls the UE to skip the PDCCH monitoring on Type 3 CSS and USS.

Optionally, the behavior of the UE under the PDCCH monitoring window configuration can be based on a specific search space or a group of specific search spaces. For instance, in the first time window, it is required for the UE to monitor the USS, while in the second time window, it is not required for the UE to monitor the USS, but the CSS might be monitored; alternatively, in the first time window, it is required for the UE to monitor a specific search space or a search space group, while in the second time window, it is not required for the UE to monitor this specific search space or search space group, but other search spaces might be monitored, wherein the specific search space or search space group can be predefined or preconfigured.

In the embodiments of the disclosure, an optional embodiment is provided for Operation S101, the periodical PDCCH monitoring window is configured through UE-specific RRC signaling, and specifically it can include receiving the UE-specific RRC signaling for indicating the above configuration information. The configuration information includes, but is not limited to, a period, a length of the first time window, and a starting position of the first time window, or the like. After having received the RRC signaling for configuring the PDCCH monitoring window, the UE periodically performs the PDCCH monitoring in the first time window and/or skips the PDCCH monitoring in the second time window.

In the embodiments of the disclosure, another optional embodiment is provided for Operation S101, the periodical PDCCH monitoring window is configured through UE-specific RRC signaling, and the configuration information should be further activated or deactivated through the DCI, and it can specifically include: receiving UE-specific RRC signaling for indicating the above configuration information, and receiving the DCI for activating the configuration information. The configuration information includes, but is not limited to, a period, a length of the first time window (or the second time window), or the like. The starting time domain position of the first time window or the second time window is determined by DCI activating signaling.

Optionally, the starting position of the first time window or the second time window is a position of a first preset interval after the corresponding DCI (activating signaling) has been received. The first preset interval can be predefined, preconfigured through RRC signaling, or indicated by the DCI for activating. After having received the DCI signaling for activating the configuration information of the PDCCH monitoring, the UE starts to periodically performs the PDCCH monitoring in the first time window and/or skip the PDCCH monitoring in the second time window according to the activated configuration information, after having received the DCI signaling for deactivating the configuration information of the periodical PDCCH monitoring, the UE stops periodically performing the PDCCH monitoring in the first time window and/or skipping the PDCCH monitoring in the second time window.

In order to differentiate from the previous periodical PDCCH monitoring window configured through RRC signaling, the PDCCH monitoring window activated or deactivated here through DCI can be referred to as a semi-persistent PDCCH monitoring window.

In addition, the UE can be further configured with a plurality of periodical PDCCH monitoring windows through RRC signaling, and at least one of the configuration information of the plurality of periodical PDCCH monitoring windows is activated or deactivated through the DCI.

In the embodiments of the disclosure, the UE can be configured with a plurality of periodical PDCCH monitoring windows, that is to say, Operation S101 can specifically include: receiving at least two pieces of the configuration information of periodical PDCCH monitoring, then Operation S101 can specifically include: according to the at least two pieces of configuration information, performing the PDCCH monitoring in respective first time window, and/or, skipping the PDCCH monitoring in respective second time window. Specifically, according to at least two pieces of configuration information, the PDCCH monitoring is respectively performed on type 3 CSS and USS in the respective first time window, and/or, the PDCCH monitoring is skipped on type 3 CSS and USS in the respective second time window.

Each configuration information corresponds to an independent configuration, and this can be understood as a plurality of configurations with the same configuration parameter and different valuations. The periods, the length of first time window (or second time window), and the starting position of first time window (or second time window) of these plural configurations can be respectively configured.

Optionally, when at least one configuration of the at least two configurations is in the first time window, the UE performs the PDCCH monitoring, i.e., as long as one configuration is in the PDCCH monitoring status, it is required for UE to perform the PDCCH monitoring; and/or, when the at least two configurations are all in the second time window, the PDCCH monitoring is skipped, i.e., only when all configurations are in the PDCCH monitoring skipping status, the UE then skips the PDCCH monitoring.

Figure 6:
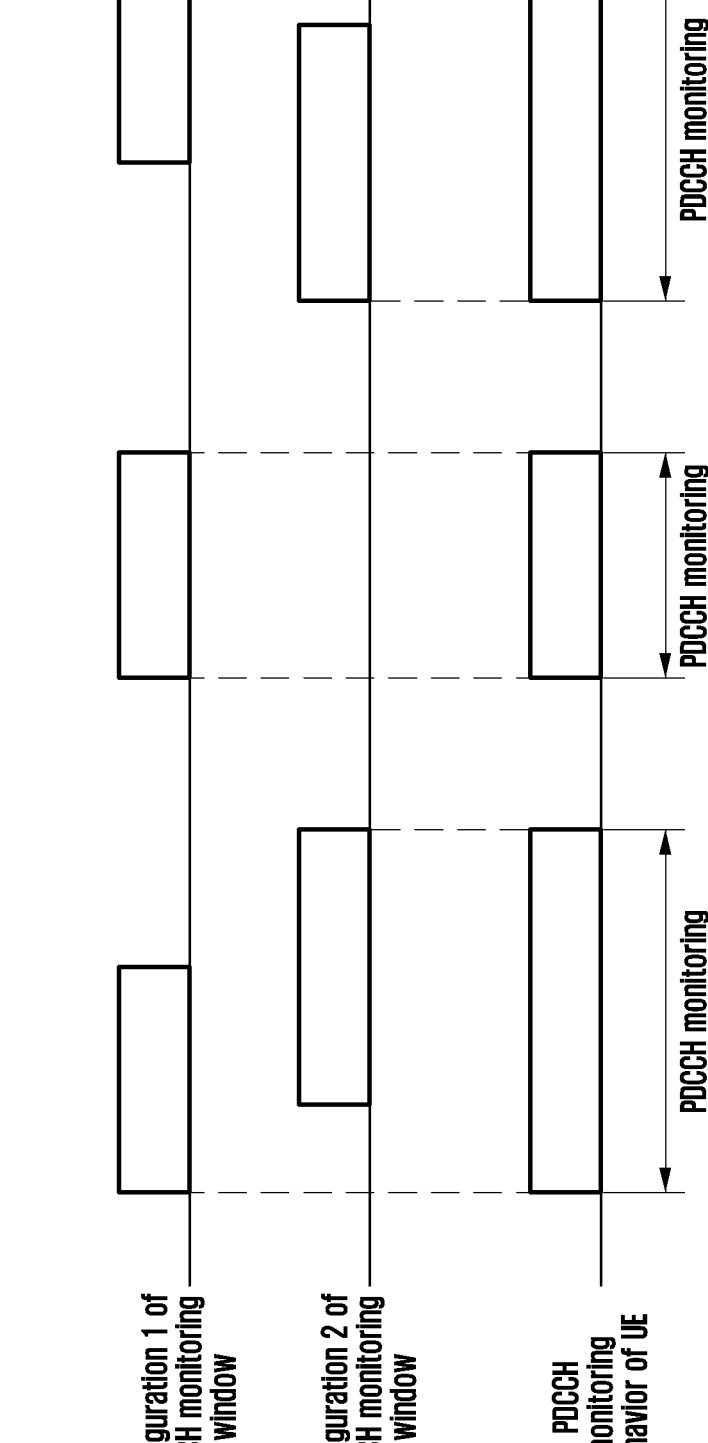
FIG. 6 is a schematic diagram of a plurality of PDCCH monitoring window configurations according to an embodiment of the disclosure.

FIG. 6 is a schematic diagram of a plurality of PDCCH monitoring window configurations according to an embodiment of the disclosure.

Referring to FIG. 6, with an example of the UE being configured with two periodical PDCCH monitoring windows, the PDCCH monitoring behavior of the UE can be regarded as the effect of getting the union of set of the two PDCCH monitoring windows.

In actual application, the DRX mechanism of the MAC layer and the PDCCH monitoring window mechanism of the above physical layer can be combined to further save the UE power consumption. For instance, the UE can monitor Type 3 CSS and USS at a part of time during the DRX active time according to the configuration information of PDCCH monitoring, while there is no need to monitor Type 3 CSS and USS at other time of the DRX Active Time, and all PDCCH monitoring is stopped at the DRX non-Active Time.

Figure 7:
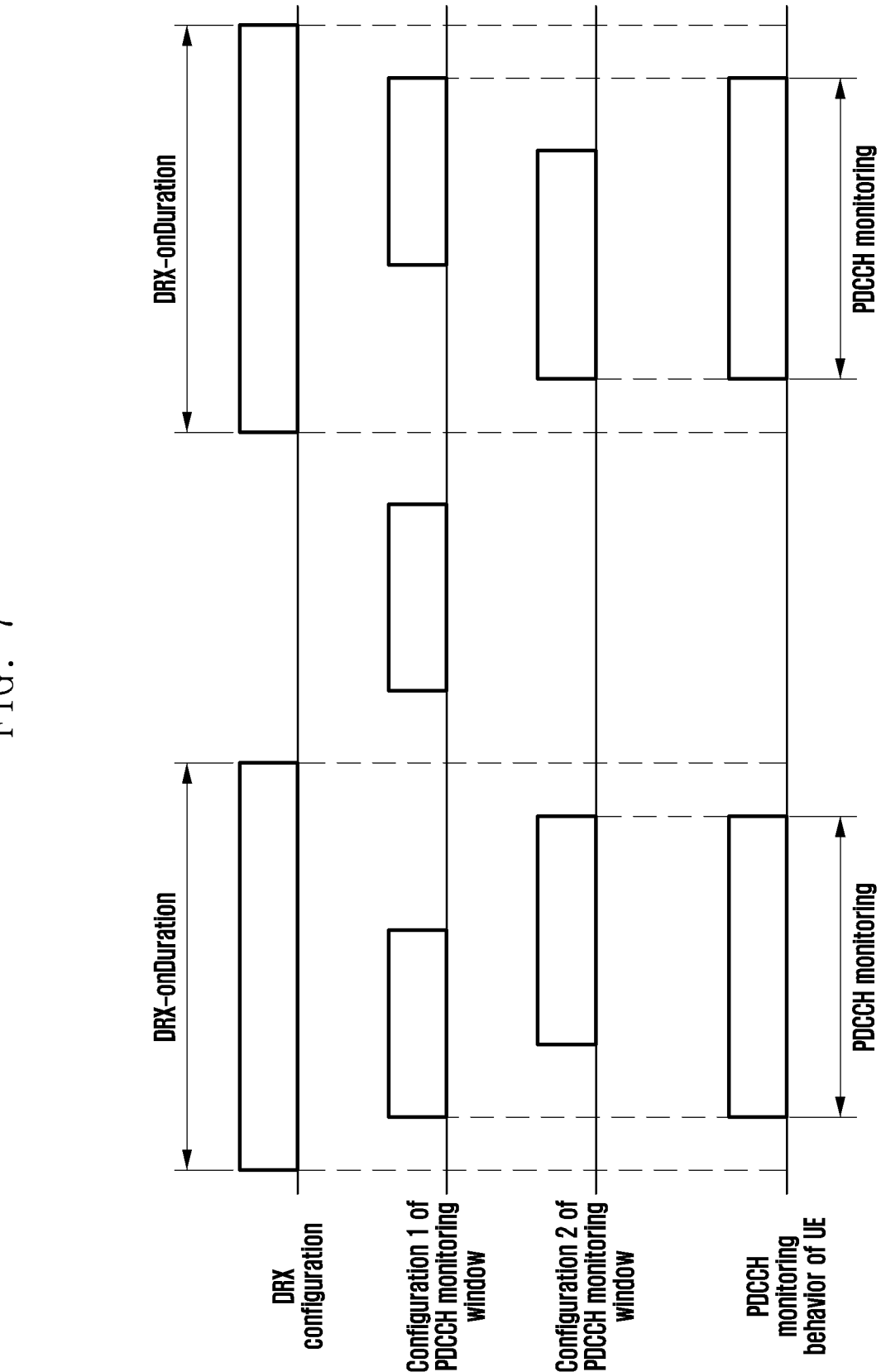
FIG. 7 is a schematic diagram of a plurality of PDCCH monitoring window configurations under the DRX mechanism according to an embodiment of the disclosure.

FIG. 7 is a schematic diagram of a plurality of PDCCH monitoring window configurations under the DRX mechanism according to an embodiment of the disclosure.

Referring to FIG. 7, with an example of the UE being configured with two periodical monitoring windows, the PDCCH monitoring behavior of the UE can be regarded as the effect of getting the union of set of two PDCCH monitoring windows and the DRX Active Time, and the power consumption of the UE on PDCCH monitoring is further saved during the DRX Active Time.

In the embodiments of the disclosure, the above at least two pieces of configuration information can also be respectively applied to one of the following circumstances.

(1) Different Data Services

That is to say, the configuration of each PDCCH monitoring window can be matched with one type of data service, the base station can configure corresponding PDCCH monitoring windows for the UE based on a plurality of types of data services, so that, based on saving the power consumption of the UE on the PDCCH monitoring, the plurality of the periodical monitoring windows also make the data services more matched.

(2) Different Service Cells

That is to say, a plurality of the PDCCH monitoring window configurations are respectively used for different service cells. One service cell can be associated with one PDCCH monitoring window configuration, and one PDCCH monitoring window configuration can be associated with one or more service cell(s). Optionally, the two pieces of configuration information respectively contain the index numbers of the corresponding service cells, and the UE periodically performs the PDCCH monitoring and/or skips the PDCCH monitoring on the corresponding service cells based on the at least two pieces of configuration information.

(3) Different Service Cell Groups

That is to say, a plurality of the PDCCH monitoring window configurations are respectively used for different service cell groups. One service cell group can be associated with one PDCCH monitoring window configuration, and one PDCCH monitoring window configuration can be associated with one or more service cell group(s). Optionally, the above two pieces of configuration information respectively contain the index numbers of the corresponding service cell groups, and the UE periodically performs the PDCCH monitoring and/or skips the PDCCH monitoring on the corresponding service cell groups based on the at least two pieces of configuration information.

(4) Different Search Spaces

That is to say, a plurality of the PDCCH monitoring window configurations are respectively used for different search spaces. One search space can be associated with one PDCCH monitoring window configuration, and one PDCCH monitoring window configuration can be associated with one or more search space(s). Optionally, the above two pieces of configuration information respectively contain the index numbers of the corresponding search spaces, and the UE periodically performs the PDCCH monitoring and/or skips the PDCCH monitoring on the corresponding search spaces based on the at least two pieces of configuration information.

(5) Different Search Space Groups

That is to say, a plurality of PDCCH monitoring window configurations are respectively used for different search space groups. One search space group is associated with one PDCCH monitoring window configuration, and one PDCCH monitoring window configuration can be associated with one or more search space group(s). Optionally, the above two pieces of configuration information respectively contain the index numbers of the corresponding search space groups, and UE periodically performs PDCCH monitoring and/or to skips PDCCH monitoring on the corresponding search spaces groups based on these at least two pieces of configuration information.

(6) At Least One of Type 1 CSS, Type 2 CSS, Type 3 CSS and USS

That is to say, a plurality of PDCCH monitoring window configurations are respectively used for at least one of Type 1 CSS, Type 2 CSS, Type 3 CSS and USS. For instance, one PDCCH monitoring window configuration is used for CSS, another PDCCH monitoring window configuration is used for USS, and so on.

By the technical solution provided by the embodiments of disclosure, the UE utilizes the periodical PDCCH monitoring windows to save the power consumption on the PDCCH monitoring, so as to achieve the objective of power-saving, and it is avoided that UE cannot timely receive scheduling information to thereby cause data transmission delay. Moreover, a plurality of periodical PDCCH monitoring windows are more matched with service characteristics, so as to satisfy different service requirements, and to realize equilibrium between the power-saving of various service characteristics and timely transmission.

Figure 8:
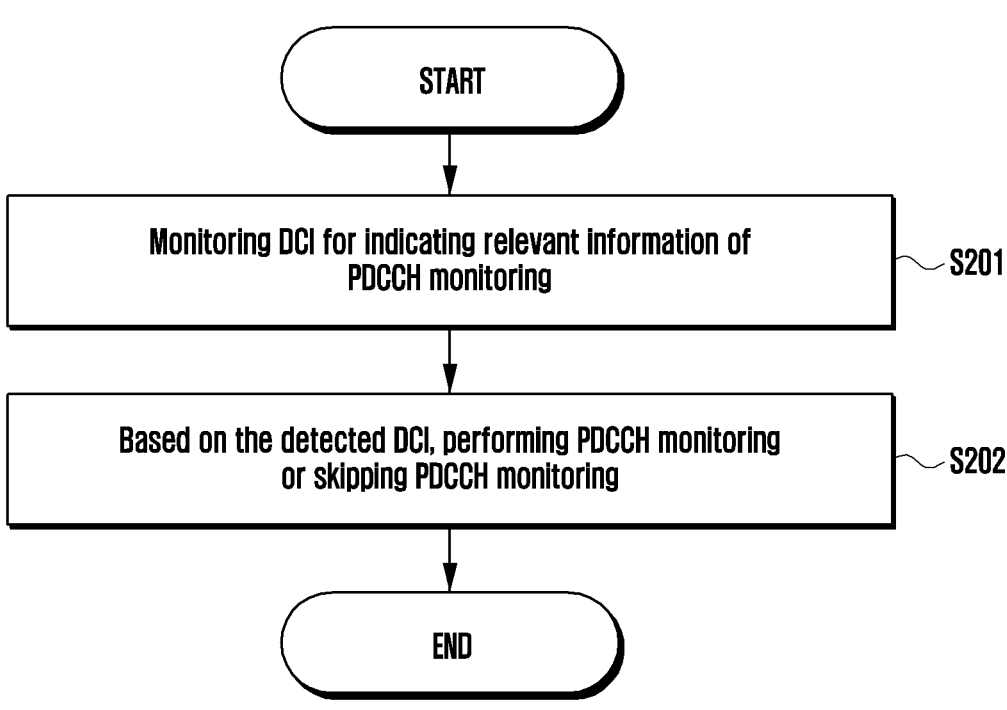
FIG. 8 is a schematic diagram of a flow of a method performed by a UE according to an embodiment of the disclosure.

FIG. 8 is a schematic diagram of a flow of another method performed by a UE according to an embodiment of the disclosure.

Referring to FIG. 8, an embodiment of the disclosure provides a method performed by a user equipment UE in a communication system, the method includes:

Operation S201: monitoring DCI for indicating relevant information of PDCCH monitoring; and Operation S202: based on the detected DCI, performing the PDCCH monitoring or skipping the PDCCH monitoring.

In the embodiments of the disclosure, the UE performing or skipping the PDCCH monitoring means performing or skipping the PDCCH monitoring on Type 3 CSS and USS. Alternatively, the UE performing or skipping the PDCCH monitoring means performing or skipping the PDCCH monitoring on USS. Alternatively, the UE performing or skipping the PDCCH monitoring means performing or skipping the PDCCH monitoring on a preconfigured search space (SS) or search space group (SSG). Alternatively, the UE performing or skipping the PDCCH monitoring means performing or skipping the PDCCH monitoring on a preconfigured search space set (SSS) or search space set group (SSSG).

The DCI includes at least one of the following indication fields:

(1) an indication field for indicating a PDCCH monitoring window, that is, an indication field for indicating the UE to start a PDCCH monitoring window. A starting position of the PDCCH monitoring window is a position of a second preset interval after the DCI has been detected, and the PDCCH monitoring is performed on Type 3 CSS and USS in the PDCCH monitoring window; wherein the length of the PDCCH monitoring window is indicated by UE-specific RRC signaling and/or the DCI, for instance, the indication field can directly indicate the length of the PDCCH monitoring window, for another instance, the length of the PDCCH monitoring window can be configured through RRC signaling, alternatively, a plurality of candidate values are configured for the length of the PDCCH monitoring window through the RRC signaling, and the DCI further indicates which length is used.

(2) an indication field for indicating to early terminate a PDCCH monitoring window, wherein a progressing PDCCH monitoring window is terminated at a position of a third preset interval after the DCI has been detected.

(3) an indication field for indicating to start the PDCCH monitoring, wherein the PDCCH monitoring on Type 3 CSS and USS is started at a position of a fourth preset interval after the DCI has been detected.

(4) an indication field for indicating to start the search space or search space group of the PDCCH monitoring, wherein the PDCCH monitoring is started on the corresponding search space or search space group at a position of a fifth preset interval after the DCI has been detected.

(5) an indication field for indicating the PDCCH skipping window, wherein a starting position of the PDCCH skipping window is a position of a sixth preset interval after the DCI has been detected, and the PDCCH monitoring is skipped in the PDCCH skipping window, for example, the PDCCH monitoring is skipped on Type 3 CSS and USS; wherein the length of the PDCCH skipping window is indicated by UE-specific RRC signaling and/or the DCI. For instance, the indication field can directly indicate the time duration of the PDCCH skipping window, for another instance, the length of the PDCCH skipping window can be configured through RRC signaling, alternatively, a plurality of candidate values are configured for the length of the PDCCH skipping window through the RRC signaling, and the DCI further indicates which length is used.

(6) an indication field for indicating to early terminate the PDCCH skipping window, wherein a progressing PDCCH skipping window is terminated at a position of a seventh preset interval after the DCI has been detected. That is to say, the UE is indicated to switch from the PDCCH monitoring skipping to the PDCCH monitoring, for instance, to start the PDCCH monitoring on type 3 CSS and USS.

(7) an indication field for indicating to stop the PDCCH monitoring, wherein the PDCCH monitoring, such as the PDCCH monitoring on Type 3 CSS and USS, is stopped at a position of an eighth preset interval after the DCI has been detected.

(8) an indication field for indicating to stop the search space or search space group of the PDCCH monitoring, wherein the PDCCH monitoring on the corresponding search space or search space group is stopped at a position of a ninth preset interval after the DCI has been detected, while the PDCCH monitoring on other search spaces can be maintained.

(9) an indication field for indicating the aggregation level or aggregation level set of candidate PDCCHs to which at least one search space corresponds respectively, that is to say, the UE monitors the PDCCH according to indicated aggregation level.

(10) an indication field for indicating numbers of candidate PDCCHs respectively for one or more aggregation level(s) to which at least one search space corresponds respectively, that is to say, the UE monitors the PDCCH according to indicated numbers of candidate PDCCHs.

As for the embodiments of the disclosure, the above various preset intervals can be predefined, preconfigured through RRC layer signaling, or indicated by the DCI.

In the embodiments of the disclosure, the above DCI can be a UE group common DCI, that is to say, the base station can indicate through the UE group common DCI to start the PDCCH monitoring, or start one PDCCH monitoring window, or early terminate a progressing PDCCH skipping window, or the like. For instance, the UE group common DCI includes a plurality of information blocks, different information blocks correspond to different UEs, and starting positions of information blocks to which UEs correspond are preconfigured in the UE group common DCI, for instance, the UE is configured with a starting position of its own information block in the DCI through high-layer signaling, and the information block of the UE can include at least one of the above indication fields. Alternatively, the above DCI can also be a DCI that schedules the physical downlink shared channel (PDSCH) or physical uplink shared channel (PUSCH), but it is not limited to this, for instance, the scheduling DCI is used for indicating the PDCCH skipping, or PDCCH skipping window, or to early terminate a progressing PDCCH monitoring window.

Optionally, the UE does not monitor the Type 3 CSS and USS, but only monitors the above UE group common DCI, and after having detected that the DCI indicated to start the PDCCH monitoring, the UE then starts to monitor the Type 3 CSS and USS. Through this method, the base station can indicate the UE to start the PDCCH monitoring through DCI when it is certain that there is downlink data arriving, so as to prevent the UE from prematurely starting unnecessary PDCCH monitoring, to thereby save the power consumption of the UE on the PDCCH monitoring.

Optionally, the UE can start to monitor the UE group common DCI after having received high-layer signaling for activating the above UE group common DCI. Correspondingly, the UE can stop monitoring the UE group common DCI after having received high-layer signaling for deactivating the UE group common DCI. For instance, whether the UE monitors the UE group common DCI can be activated or deactivated through high-layer signaling (such as RRC signaling or MAC control element (CE) signaling), in other words, even if the search space for monitoring the UE group common DCI is configured, the UE will not always monitor the DCI, as the UE starts to monitor the DCI after having received the activating signaling, and simultaneously stops monitoring the Type 3 CSS and USS, and the UE stops to monitor the DCI after having received the deactivating signaling, and simultaneously starts to monitor the Type 3 CSS and USS. Alternatively, the UE can also stop the DCI after having detected that DCI indicated to start the PDCCH monitoring, and simultaneously starts to monitor the Type 3 CSS and USS. Alternatively, after having detected the DCI for a preset duration, the UE stops monitoring the DCI, and simultaneously starts to monitor the Type 3 CSS and USS.

Figure 9:
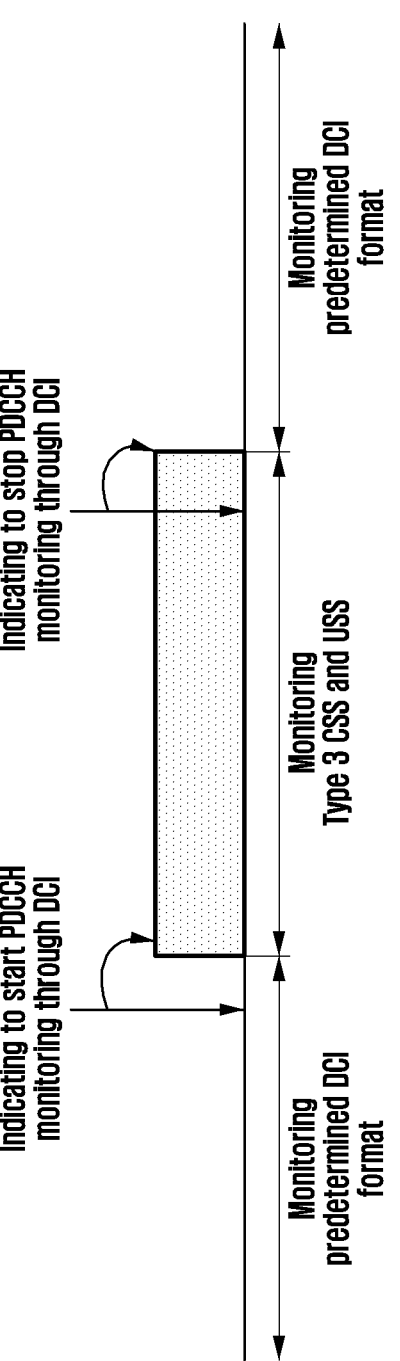
FIG. 9 is a schematic diagram of a DCI indicating to start the PDCCH monitoring according to an embodiment of the disclosure.

FIG. 9 is a schematic diagram of a DCI indicating to start the PDCCH monitoring according to an embodiment of the disclosure.

Referring to FIG. 9, for instance, after having received high-layer signaling for indicating to monitor the UE group common DCI, the UE stops monitoring the Type 3 CSS and USS, and only monitors the DCI, the UE group common DCI is employed to indicate the UE to start the PDCCH monitoring on the Type 3 CSS and USS. Here, the starting position for the UE to start the PDCCH monitoring is the position of a preset interval (such as the above fourth preset interval) after the DCI has been detected.

Corresponding to dynamically indicating the UE to start the PDCCH monitoring, the base station can also dynamically indicate the UE to stop the PDCCH monitoring during the PDCCH monitoring process, the UE might receive the DCI for indicating to stop the PDCCH monitoring, at a position of a preset interval (such as the tenth interval) after the DCI has been received, the UE stops the PDCCH monitoring, and only monitors the UE group common DCI for dynamically indicating to start the PDCCH monitoring.

Figure 10:
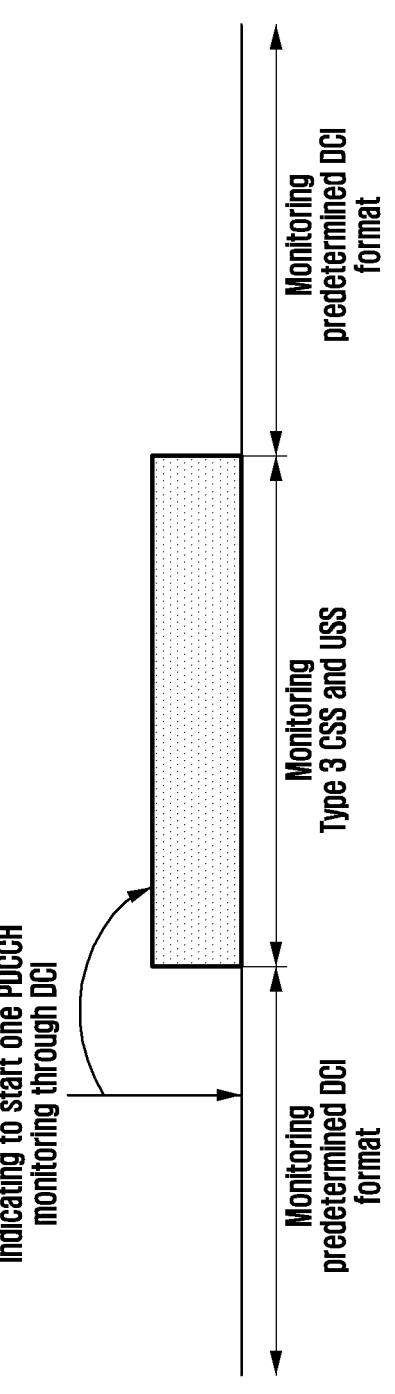
FIG. 10 is a schematic diagram of an DCI indicating to start one PDCCH monitoring window according to an embodiment of the disclosure.

FIG. 10 is a schematic diagram of an DCI indicating to start one PDCCH monitoring window according to an embodiment of the disclosure.

Referring to FIG. 10, optionally, UE does not monitor the Type 3 CSS and USS, and only monitors the UE group common DCI, the UE group common DCI is employed for indicating the UE to start one PDCCH monitoring window, and the UE performs the monitoring of the Type 3 CSS and USS in the PDCCH monitoring window. Here, the starting position of the PDCCH monitoring window is a position of a preset interval (such as the second preset interval) after the DCI has been detected.

Further, the mechanism of dynamically indicating to start the PDCCH monitoring through the UE group common DCI can be combined with the SSSG switching mechanism. For instance, the DCI for indicating to start the PDCCH monitoring can further indicate to start the PDCCH monitoring on a certain SSSG (for instance, the DCI further contains an indication field for indicating to start a search space or a search space group of PDCCH monitoring, but it is not limited thereto), that is to say, the UE only monitors the PDCCH on the corresponding SSSG, and it is not required to monitor all the search spaces contained by the Type 3 CSS and USS. Optionally, dynamically starting the PDCCH monitoring and SSSG switching can be indicated through one DCI domain (for instance, the above indication field for indicating to start the PDCCH monitoring and the indication field for indicating to start a search space or a search space group of PDCCH monitoring can be the same indication field). Exemplarily, to indicate by a 2-bit indication field, indication value "00" represents not to start the PDCCH monitoring, indication value "01" represents to start the PDCCH monitoring on SSSG #0, indication value "10" represents to start the PDCCH monitoring on SSSG #1, and indication value "11" represents to start the PDCCH monitoring on SSSG #2. As should be understood by persons skilled in the art, the above indication fields are merely by way of example, suitable variation made based on such example can also be applicable to the disclosure, and should hence be contained in the protection scope of the disclosure.

Further, the above mechanism for dynamically indicating to start the PDCCH monitoring through the UE group common DCI can be combined with the PDCCH skipping mechanism.

Optionally, during the PDCCH monitoring process, the UE can receive that the DCI indicates the PDCCH skipping is performed for a period of time, the UE does not monitor the Type 3 CSS and USS during the PDCCH monitoring skipping period, but monitors the search space to which the UE group common DCI corresponds, that is to say, the UE can monitor the UE group common DCI in the time duration of the PDCCH skipping window, the DCI can indicate to start one PDCCH monitoring window, or to early terminate a progressing PDCCH skipping window, that is, the UE starts to monitor the Type 3 CSS and USS, at the same time, UE stops monitoring the UE group common DCI.

Further, the above mechanism for dynamically indicating to start the PDCCH monitoring through the UE group common DCI can be combined together with the DRX mechanism of the MAC layer, so as to achieve the effect of further the save power consumption of the UE.

Optionally, the UE can monitor the above UE group common DCI from the starting position of the DRX cycle. Specifically, from the starting position of the DRX cycle, the PDCCH monitoring on the Type 3 CSS and USS is skipped, while the UE group common DCI is detected, if the UE group common DCI is detected, and the UE group common DCI indicates to start the PDCCH monitoring, then the PDCCH monitoring on the Type 3 CSS and USS is started.

Figure 11:
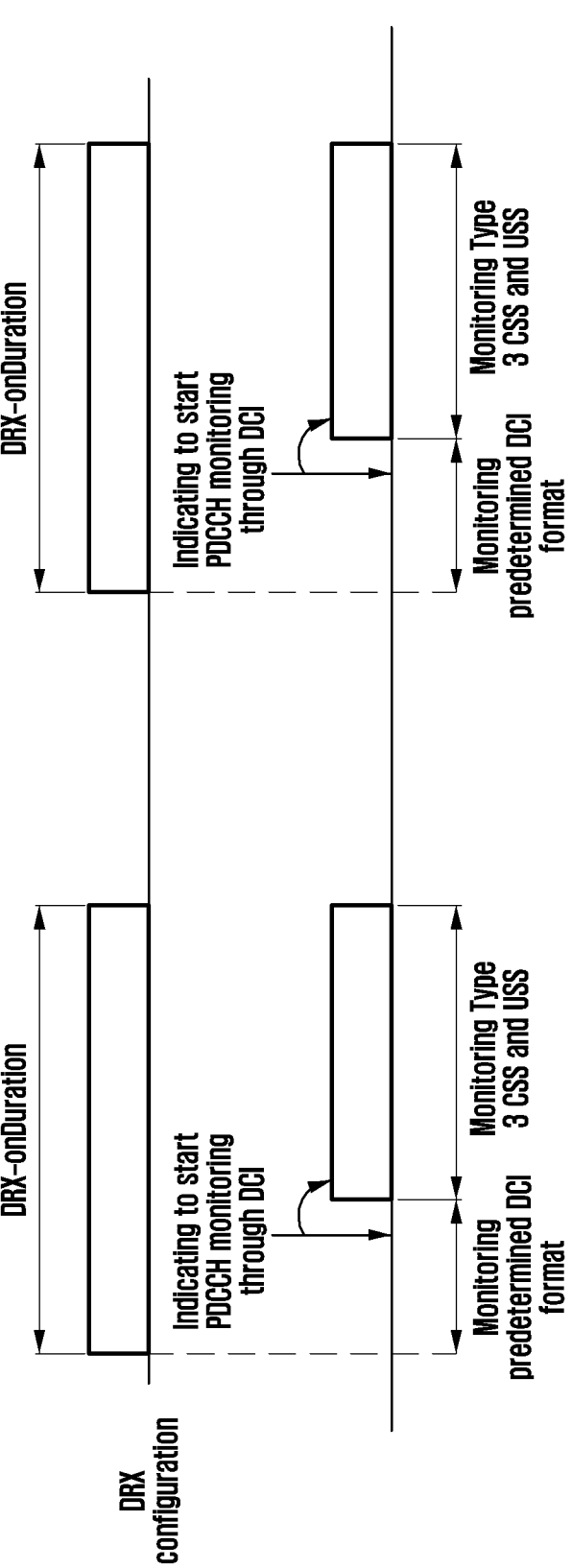
FIG. 11 is a schematic diagram of starting to monitor the DCI at the DRX cycle according to an embodiment of the disclosure.

FIG. 11 is a schematic diagram of starting to monitor the DCI at the DRX cycle according to an embodiment of the disclosure.

Referring to FIG. 11, from the starting position of the DRX, the UE does not monitor the Type 3 CSS and USS, the UE only monitors the above UE group common DCI, the DCI is employed for indicating to start the PDCCH monitoring, or start one PDCCH monitoring window, only when it has been detected that the DCI indicates to start the PDCCH monitoring, the UE then monitors the Type 3 CSS and USS, and stops monitoring the DCI, alternatively, the UE can continue monitoring the UE group common DCI to obtain other indication information, for instance, the base station can indicate the UE to skip the PDCCH monitoring through the UE group common DCI, and so on.

With respect to this situation, optionally, at the starting position of the DRX cycle, the UE starts to monitor the above UE group common DCI only after the drx-on duration timer of the DRX has been started, if the drx-on duration timer of DRX is not started, it is not required for the UE to monitor the UE group common DCI, and whether the drx-on duration timer of the DRX is started can be indicated by the base station through waking-up signaling. In addition, the longest time duration in which UE monitors the UE group common DCI can be the entire on Duration period of the DRX, for instance, the UE can stop monitoring the UE group common DCI after the persistent timer of the DRX has stopped running.

Optionally, from the starting position of the DRX cycle, the UE does not start the drx-on duration timer of the DRX, and only monitors the above UE group common DCI; the UE can start the persistent timer drx-on duration timer and start to monitor the PDCCH after having detected that the DCI indicated to start the PDCCH monitoring, that is to say, the position where the UE starts the drx-on duration timer can be after the starting position of the DRX cycle. This method has the benefit that, at each DRX cycle, the position where the drx-on duration timer is started can be controlled through DCI signaling, for instance, the base station transmits the DCI to indicate the UE to start the drx-on duration timer only after it has been determined that the downlink data of the UE has arrived.

Optionally, the UE stops monitoring the UE group common DCI after the UE group common DCI has been detected for a preset time duration. For instance, at the starting position of the DRX cycle, the UE starts to monitor the UE group common DCI, and the longest time duration in which UE monitors the DCI can be preconfigured. For instance, the UE monitors the DCI in a time window where the starting position of the DRX cycle starts, if the UE monitors that the DCI indicates to start the PDCCH monitoring, the PDCCH monitoring is started and the monitoring of the DCI is stopped; if the UE does not monitor that the DCI indicates to start the PDCCH monitoring, then the UE continuously monitors the DCI and stops monitoring the DCI after a preset duration from the start of the starting position of the DRX cycle has terminated, and the length of the preset duration can be preconfigured.

Optionally, the UE monitors the UE group common DCI in the non-Active Time of the DRX. For instance, in the non-Active Time of the DRX, the UE monitors the above UE group common DCI, and the UE group common DCI is employed for indicating to start the PDCCH monitoring, or to start one PDCCH monitoring window, if the UE monitors that the DCI indicates to start the PDCCH monitoring, the PDCCH is detected in the non-Active Time of the DRX. The UE stops monitoring the UE group common DCI after having detected that the UE group common DCI indicated to start the PDCCH monitoring; alternatively, the monitoring of the UE group common DCI is stopped after the UE group common DCI has been detected for a preset duration.

By the technical solution provided by an embodiment of the disclosure, the UE starts, skips or adjusts the PDCCH monitoring according to indication of the UE group common DCI. Then, unnecessary PDCCH monitoring by UE can be reduced to save the power consumption of the UE on the PDCCH monitoring.

Figure 12:
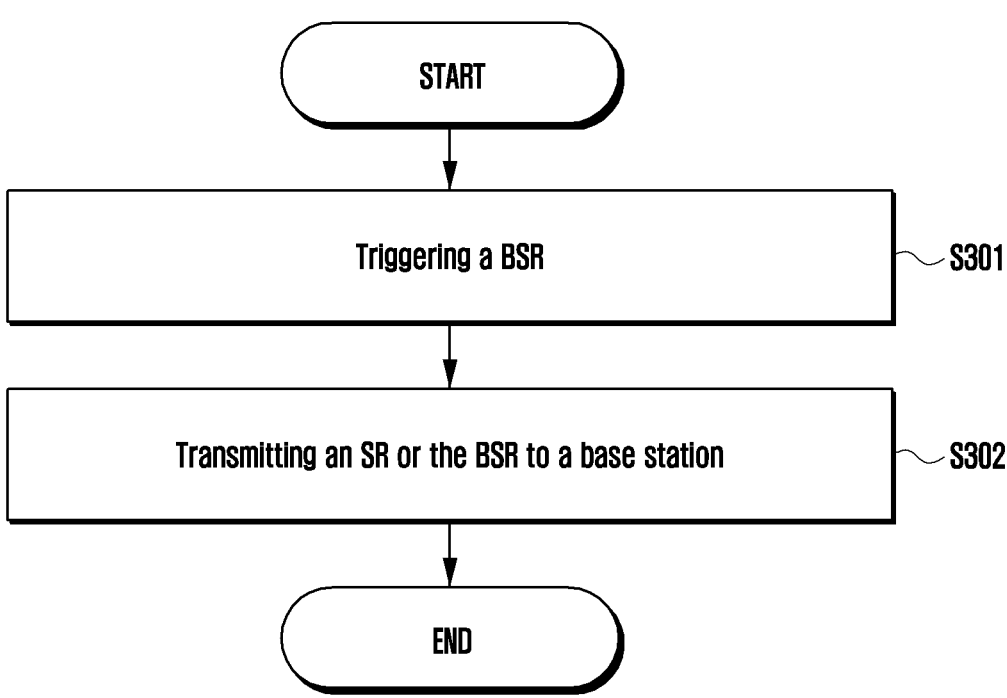
FIG. 12 is a schematic diagram of a flow of another method performed by a UE according to an embodiment of the disclosure.

FIG. 12 is a schematic diagram of a flow of another method performed by a UE according to an embodiment of the disclosure.

Referring to FIG. 12, an embodiment of the disclosure further provides another method performed by a user equipment UE in a communication system, as shown in FIG. 12, the method comprises:

Operation S301: triggering an BSR;

In the embodiments of the disclosure, since certain data services (such as extended reality (XR) service) have large amount of data and put high requirement on transmission delay, quicker request for uplink scheduling and request for bigger uplink resource blocks are required. When data packets of these data services arrive to trigger the BSR, for the pending BSR triggered by these data packets, the UE can request the base station for uplink scheduling through Operation S302, so as to reduce the transmission delay, and to request uplink resources that are matched with the data amount.

In the embodiment of the disclosure, the BSR corresponds to at least one of the following circumstances:

(1) Predefined or Preconfigured Logic Channel

Specific data service can have higher transmission priority, and is mapped to a specific logic channel, the specific logic channel can be predefined or preconfigured, and the BSR triggered by the specific data service can be understood as the BSR triggered on the specific logic channel.

(2) Predefined or Preconfigured Logic Channel Group

Specific data service can be mapped to a specific logic channel group, the specific logic channel group can be predefined or preconfigured, and the BSR triggered by the specific data service can be understood as the BSR triggered on the specific logic channel group.

Moreover, the BSR triggered by the specific data service can be understood as the BSR triggered by a data packet that satisfies a certain condition, and data packets capable of triggering the BSR and satisfying certain conditions include the following:

(3) Data Packet of Preset Service

For example, specific data service triggers the BSR. For instance, a data packet of an XR service triggers BSR, and which data packets belong to the XR service can be transmitted by the application layer to the MAC layer, that is to say, the judgment as to which data packets belong to the XR service can be realized by the UE itself.

(4) Data Packet Whose PDB Requirement is Lower than a First Threshold Value

For example, the PDB requirement of the data packet to which the BSR corresponds is lower than a preset threshold value. For instance, the PDB requirement of the corresponding data packet is smaller than or equal to 10 ms, the PDB requirements of which data packets are lower than the preset first threshold value can be transmitted by the application layer to the MAC layer, that is to say, the judgment as to the PDB requirements of which data packets are lower than the preset first threshold value can be realized by the UE itself.

(5) Data Packet Whose Remaining PDB Value is Lower than a Second Threshold Value For example, the remaining PDB of the data packet to which the BSR corresponds is lower than a preset second threshold value. For instance, the remaining PDB of the corresponding data packet is smaller than or equal to 10 ms, the remaining PDB means the remaining PDB to which the current timing corresponds, the remaining PDBs of which data packets are lower than the preset second threshold value can be transmitted by the application layer to the MAC layer, that is to say, the judgment as to the remaining PDBs of which data packets are lower than the preset second threshold value can be realized by the UE itself.

Operation S302: with respect to the pending BSR, transmitting the SR or the BSR to a base station through at least one of the following modes:

(1) transmitting an SR on one earliest SR resource among at least one SR resource.

The at least one SR resource is the SR resource configured for any SR configuration, that is, the UE can use the PUCCH resource configured for any SR configuration to transmit the SR, that is, UE can use the earliest one of PUCCH resource configured for any SR configuration to transmit the SR.

Alternatively, in addition to using the SR configuration associated with the corresponding logic channel, the UE can also use other SR configurations, that is, the at least one SR resource is at least one of an SR resource preconfigured for the BSR (specific SR), an SR resource preconfigured for a logic channel to which the BSR corresponds, an SR resource preconfigured for other logic channels than the logic channel to which the BSR corresponds, an SR resource configured for secondary cell (SCell) beam failure recovery, and an SR resource configured for consistent listen before talk LBT failure recovery. The UE can use the earliest one in the PUCCH configured for these SRs to transmit the SR.

(2) transmitting the SR on an SR resource preconfigured for the BSR, wherein the UE can use the preconfigured specific SR resource to transmit the SR.

Optionally, the base station configures the specific SR for the BSR to which the specific logic channel corresponds, or the BSR triggered by the data packet that satisfies a specific condition, if the BSR is pending and there is no available uplink resource to transmit it, then the BSR triggers the SR, and the UE can use the preconfigured specific SR resource to transmit the SR.

Optionally, the base station can configure two SRs for one logic channel, one SR corresponds to the BSR triggered by an ordinary data packet, another SR corresponds to the BSR triggered by a data packet that satisfies a specific condition, correspondingly, at the UE side, the UE receives two SR configurations with respect to one logic channel, the two configurations are respectively used for the BSR triggered by an ordinary data packet and the BSR triggered by a data packet that satisfies a specific condition, and the UE chooses the corresponding SR configuration according to the data packet attribute to which the BSR corresponds.

(3) transmitting the BSR on a PUCCH resource preconfigured for the BSR, wherein the UE can use the preconfigured specific PUCCH resource to transmit the BSR.

Optionally, the base station configures the specific PUCCH resource for the BSR to which the specific logic channel corresponds, or for the BSR triggered by a data packet that satisfies a specific condition, the UE receives the PUCCH resource configuration for BSR transmission, once BSR is triggered, the UE transmits the BSR on the preconfigured specific PUCCH resource, that is to say, the BSR is regarded as uplink control information (UCI) of the physical layer to be transmitted on the PUCCH, as compared with requesting uplink scheduling through the SR, this can quickly request the uplink scheduling, and request the uplink resource more matched in size.

(4) initiating a random access process on the PRACH resource to request for resource scheduling.

Optionally, if the earliest available SR resource is after the earliest available PRACH resource, a random access process is initiated on the earliest available PRACH resource to request resource scheduling.

That is to say, if the BSR to which the specific logic channel corresponds or the BSR triggered by a data packet that satisfies a specific condition is pending and there is no available uplink resource to transmit it, then the BSR triggers the SR, if the earliest available SR resource of the UE is after the earliest PRACH resource, particularly, if the earliest available SR resource is after a preset interval of the PRACH resource, the UE initiates a random access process on the earliest PRACH resource to request uplink scheduling, the benefit of such a practice is the capability to quickly request uplink scheduling.

Optionally, if the earliest available SR resource is after the earliest available PRACH resource, and the PRACH resource is preconfigured for the BSR, the random access process is initiated on the earliest available PRACH resource to request resource scheduling.

That is to say, the base station configures the specific PRACH resource for the BSR to which the specific logic channel corresponds or the BSR triggered by a data packet that satisfies a specific condition, so as to initiate a random access process to request the uplink scheduling, if the BSR is pending and there is no available uplink resource to transmit it, then the BSR triggers the SR, if the UE has the available SR resource, but the earliest available SR resource is after the specific PRACH resource, particularly, the earliest available SR resource is after a preset interval of the specific PRACH resource, the UE initiates a random access process on the preconfigured specific PRACH resource to request uplink scheduling, the benefit of such a practice is the capability to quickly request uplink scheduling.

Optionally, if there is no available SR resource, the random access process is initiated on the PRACH resource preconfigured for the BSR to request resource scheduling.

That is to say, the base station configures the specific PRACH resource for the BSR to which the specific logic channel corresponds or the BSR triggered by a data packet that satisfies a specific condition to initiate the random access process to request uplink scheduling, if the BSR is pending and there is no available uplink resource to transmit it, then the BSR triggers the SR, if the UE has no available SR resource, the UE initiates the random access process on the preconfigured specific PRACH resource to request uplink scheduling.

By the technical solution provided by an embodiment of the disclosure, the UE can enhance the uplink scheduling request, to reduce the transmission delay, and to request the uplink resource matched with the data amount.

An embodiment of the disclosure further provides a method performed by a base station in a communication system, the method comprises:

Operation S401: transmitting, to a UE, configuration information of periodical PDCCH monitoring, wherein each cycle of the configuration information includes a first time window and/or a second time window.

Operation S402: based on the configuration information, transmitting a PDCCH of the UE on type 3 CSS and USS of the UE in the first time window, and/or not transmitting a PDCCH of the UE on type 3 CSS and USS of the UE in the second time window.

Optionally, the configuration information includes at least one of the following information:

a period;

a length of the first time window;

a length of the second time window;

a starting position of the first time window; and a starting position of the second time window.

Optionally, transmitting, to a UE, configuration information of periodical PDCCH includes at least one of the following circumstances:

transmitting UE-specific RRC signaling for indicating configuration information to the UE; and transmitting UE-specific RRC signaling for indicating configuration information to the UE, and transmitting DCI for activating the configuration information to the UE, wherein the starting position of the first time window or the second time window is a position of a first preset interval after the corresponding DCI has been received.

Optionally, transmitting configuration information of periodical PDCCH monitoring window to the UE includes:

transmitting at least two pieces of configuration information of the periodical PDCCH monitoring windows to the UE.

Based on the configuration information, transmitting a PDCCH of the UE on type 3 CSS and USS of the UE in the first time window, and/or not transmitting a PDCCH of the UE on type 3 CSS and USS of the UE in the second time window includes:

based on the at least two pieces of configuration information, respectively transmitting the PDCCH of the UE on type 3 CSS and USS of the UE in the respective first time window, and/or, not transmitting the PDCCH of the UE on type 3 CSS and USS of the UE in the respective second time window.

Optionally, at least two pieces of configuration information are respectively used for one of the following circumstances:

different data services;

different service cells;

different service cell groups;

different search spaces;

different search space groups; and at least one of type 1 CSS, type 2 CSS, type 3 CSS, and USS.

An embodiment of the disclosure further provides a method performed by a base station in a communication system, the method comprises:

Operation S501: transmitting, to a UE, DCI for indicating relevant information of PDCCH monitoring; and Operation S502: based on the relevant information of PDCCH monitoring, transmitting or not transmitting a PDCCH to the UE.

Wherein, the DCI includes at least one of the following indication fields:

an indication field for indicating a PDCCH monitoring window, wherein a starting position of the PDCCH monitoring window is a position of a second preset interval after the DCI has been detected, and the PDCCH monitoring is performed in the PDCCH monitoring window;

an indication field for indicating to early terminate a PDCCH monitoring window, wherein a progressing PDCCH monitoring window is terminated at a position of a third preset interval after the DCI has been detected;

an indication field for indicating to start the PDCCH monitoring, wherein the PDCCH monitoring is started at a position of a fourth preset interval after the DCI has been detected;

an indication field for indicating to start search space or search space group of PDCCH monitoring, wherein the PDCCH monitoring on the corresponding search space or search space group is started at a position of a fifth preset interval after the DCI has been detected;

an indication field for indicating a PDCCH skipping window, wherein a starting position of the PDCCH skipping window is a position of a sixth preset interval after the DCI has been detected, and the PDCCH monitoring is skipped in the PDCCH skipping window;

an indication field for indicating to early terminate the PDCCH skipping window, wherein a progressing PDCCH skipping window is terminated at a position of a seventh preset interval after the DCI has been detected;

an indication field for indicating to skip the PDCCH monitoring, wherein the PDCCH monitoring is skipped at a position of an eighth preset interval after the DCI has been detected;

an indication field for indicating to skip the PDCCH monitoring on the corresponding search space or search space group of PDCCH monitoring, at a position of a ninth preset interval after the DCI has been detected;

an indication field for indicating an aggregation level or a set of aggregation level for candidate PDCCHs to which at least one search space corresponds respectively; and an indication field for indicating numbers of candidate PDCCHs respectively for one or more aggregation level(s) to which at least one search space corresponds respectively.

Optionally, the length of the PDCCH monitoring window is indicated by UE-specific RRC signaling and/or the DCI; and/or the length of the PDCCH skipping window is indicated by the UE-specific RRC signaling and/or the DCI.

Optionally, the DCI is a DCI employed to schedule the PDSCH or PUSCH, or the DCI is a UE group common DCI.

Optionally, the UE group common DCI includes a plurality of information blocks that correspond to different UEs.

Optionally, a starting position of the information blocks to which UEs correspond are preconfigured in the UE group common DCI.

The methods performed by the base station of the various embodiments of the disclosure are corresponding to the methods of the various embodiments at the UE side, reference can be made to the corresponding methods illustrated in the various embodiments at the UE side for detailed functional descriptions and advantageous effects produced by the methods performed by the base station, while no redundancy is made in this context.

An embodiment of the disclosure further provides an electronic equipment that comprises a memory, a processor, and a computer program stored on the memory, when the processor executes the computer program, the steps of the methods provided by the various method embodiments of the disclosure can be realized. Optionally, the electronic equipment can mean a UE, or the electronic equipment can be a base station.

According to an embodiment, a method performed by a user equipment (UE) in a communication system may be provided.

According to an embodiment, the method may include receiving configuration information of periodical physical downlink control channel (PDCCH) monitoring.

According to an embodiment, each cycle of the configuration information may include a first time window and/or a second time window.

According to an embodiment, the method may include according to the configuration information, performing PDCCH monitoring on type 3 common search space (CSS) and UE-specific search space (USS) in the first time window, and/or, skipping PDCCH monitoring on type 3 CSS and USS in the second time window.

According to an embodiment, the configuration information may include at least one of: a period; a length of the first time window; a length of the second time window; a starting position of the first time window; or a starting position of the second time window.

According to an embodiment, the receiving of the configuration information of periodical PDCCH monitoring may include at least one of: receiving UE-specific radio resource control (RRC) signaling for indicating the configuration information; or receiving UE-specific RRC signaling for indicating the configuration information, and receiving downlink control information (DCI) for activating the configuration information, wherein the starting position of the first time window or the second time window is a position of a first preset interval after a corresponding DCI has been received.

According to an embodiment, the receiving of the configuration information of periodical PDCCH monitoring may include: receiving at least two pieces of configuration information of periodical PDCCH monitoring; and according to the configuration information, performing PDCCH monitoring on type 3 CSS and USS in the first time window, and/or, skipping PDCCH monitoring on type 3 CSS and USS in the second time window may include: according to the at least two pieces of configuration information, respectively performing PDCCH monitoring on type 3 CSS and USS in the respective first time window, and/or, skipping PDCCH monitoring on type 3 CSS and USS in the second time window.

According to an embodiment, when at least one configuration of at least two configurations is in the first time window, PDCCH monitoring may be performed; and/or when the at least two configurations are both in the second time window, PDCCH monitoring may be skipped.

According to an embodiment, the at least two pieces of configuration information are respectively employed for one of: different data services; different service cells, wherein the at least two pieces of configuration information respectively contain index numbers of corresponding service cells; different service cell groups, wherein the at least two pieces of configuration information respectively contain index numbers of corresponding service cell groups; different search spaces, wherein the at least two pieces of configuration information respectively contain index numbers of corresponding search spaces; different search space groups, wherein the at least two pieces of configuration information respectively contain index numbers of corresponding search space groups; or at least one of type 1 CSS, type 2 CSS, type 3 CSS, and USS.

According to an embodiment, a method performed by a user equipment (UE) in a communication system may be provided.

According to an embodiment, the method may include monitoring downlink control information (DCI) for indicating relevant information of physical downlink control channel (PDCCH) monitoring.

According to an embodiment, the method may include based on the DCI, performing PDCCH monitoring or skipping PDCCH monitoring.

According to an embodiment, the DCI may include at least one of: an indication field for indicating a PDCCH monitoring window, wherein a starting position of the PDCCH monitoring window is a position of a second preset interval after the DCI has been detected, and wherein PDCCH monitoring is performed in the PDCCH monitoring window; an indication field for indicating to early terminate a PDCCH monitoring window, wherein a progressing PDCCH monitoring window is terminated at a position of a third preset interval after the DCI has been detected; an indication field for indicating to start PDCCH monitoring, wherein PDCCH monitoring is started at a position of a fourth preset interval after the DCI has been detected; an indication field for indicating to start search space or search space group of PDCCH monitoring, wherein PDCCH monitoring is started on the corresponding search space or search space group at a position of a fifth preset interval after the DCI has been detected; an indication field for indicating a PDCCH skipping window, wherein a starting position of the PDCCH skipping window is a position of a sixth preset interval after the DCI has been detected, and wherein PDCCH monitoring is skipped in the PDCCH skipping window; an indication field for indicating to early terminate the PDCCH skipping window, wherein a progressing PDCCH skipping window is terminated at a position of a seventh preset interval after the DCI has been detected; an indication field for indicating to stop PDCCH monitoring, wherein PDCCH monitoring is stopped at a position of an eighth preset interval after the DCI has been detected; an indication field for indicating a search space or a search space group wherein PDCCH monitoring will be stopped, wherein PDCCH monitoring on the corresponding search space or search space group is stopped at a position of a ninth preset interval after the DCI has been detected; an indication field for indicating an aggregation level or an aggregation level set of candidate PDCCHs to which at least one search space corresponds respectively; or an indication field for indicating numbers of candidate PDCCHs respectively for one or more aggregation level(s) to which at least one search space corresponds respectively.

According to an embodiment, a length of the PDCCH monitoring window may be1 indicated by UE-specific radio resource control (RRC) signaling and/or the DCI; and/or a length of PDCCH skipping window may be indicated by UE-specific RRC signaling and/or the DCI.

According to an embodiment, the DCI may include a DCI employed to schedule a physical downlink shared channel (PDSCH) or a physical uplink shared channel PUSCH, or the DCI is a UE group common DCI.

According to an embodiment, the monitoring of the DCI for indicating relevant information of PDCCH monitoring may include: monitoring the UE group common DCI under at least one of: starting to monitor the UE group common DCI after having received high-layer signaling for activating the UE group common DCI, monitoring the UE group common DCI within a duration of the PDCCH skipping window, monitoring the UE group common DCI from the starting position of a discontinuous reception discontinuous reception (DRX) cycle, monitoring the UE group common DCI in non-activation time of DRX, or stopping monitoring the UE group common DCI under at least one of: stopping monitoring the UE group common DCI after having received high-layer signaling for de-activating the UE group common DCI, stopping monitoring the UE group common DCI when the UE group common DCI is detected and the UE group common DCI indicates to start PDCCH monitoring, and stopping monitoring the UE group common DCI after the UE group common DCI has been continuously monitored for a preset duration.

According to an embodiment, the monitoring of the UE group common DCI from the starting position of a DRX cycle may include: from the starting position of the DRX cycle, skipping PDCCH monitoring on type 3 common search space (CSS) and UE-specific search space (USS), and monitoring the UE group common DCI, if the UE group common DCI is detected and the UE group common DCI indicates to start PDCCH monitoring, then starting PDCCH monitoring on type 3 CSS and USS.

According to an embodiment, the monitoring of the UE group common DCI from the starting position of a DRX cycle may further include at least one of: starting a on duration timer of the DRX when the UE group common DCI is detected and the UE group common DCI indicates to start PDCCH monitoring; and stopping monitoring the UE group common DCI after the on duration timer of the DRX has stopped running.

According to an embodiment, a method performed by a user equipment (UE) in a communication system may be provided.

According to an embodiment, the method may include triggering a buffer status report (BSR).

According to an embodiment, the method may include with respect to a pending BSR, transmitting a scheduling request (SR) or the BSR to a base station through at least one of: transmitting SR on the earliest SR resource among at least one SR resource, transmitting SR on an SR resource preconfigured for the BSR, transmitting the BSR on a PUCCH resource preconfigured for the BSR, or initiating a random access process on a physical random access channel (PRACH) resource to request for resource scheduling.

According to an embodiment, the BSR may correspond to at least one of: a predefined or preconfigured logic channel; a predefined or preconfigured logic channel group; a data packet of preset service; a data packet whose data packet delay budget (PDB) requirement is lower than a first threshold value; or a data packet whose remaining PDB value is lower than a second threshold value.

According to an embodiment, the at least one SR resource may include an SR resource configured for any SR configuration; or the at least one SR resource includes at least one of: an SR resource preconfigured for the BSR, an SR resource preconfigured for a logic channel to which the BSR corresponds, an SR resource preconfigured for other logic channels than the logic channel to which the BSR corresponds, an SR resource configured for secondary cell beam failure recovery, or an SR resource configured for consistent Listen Before Talk (LBT) failure recovery.

According to an embodiment, the initiating of the random access process on a PRACH resource to request for resource scheduling may include: if the earliest available SR resource is after the earliest available PRACH resource, then initiating the random access process on the earliest available PRACH resource to request for resource scheduling; if the earliest available SR resource is after the earliest available PRACH resource, and the available PRACH request is preconfigured for the BSR, then initiating the random access process on the earliest available PRACH resource to request for resource scheduling; or if there is no available SR resource, initiating the random access process on the PRACH resource preconfigured for the BSR to request for resource scheduling.

According to an embodiment, a method performed by a base station in a communication system may be provided.

According to an embodiment, the method may include transmitting, to user equipment (UE), configuration information of periodical physical downlink control channel (PDCCH) monitoring, wherein within each cycle of the configuration information comprises a first time window and/or a second time window.

According to an embodiment, the method may include based on the configuration information, transmitting PDCCH of the UE on type 3 common search space (CSS)

and UE-specific search space (USS) of the UE in the first time window, and/or not transmitting PDCCH of the UE on type 3 CSS and USS of the UE in the second time window.

According to an embodiment, a method performed by a base station in a communication system may be provided.

According to an embodiment, the method may include transmitting, to a user equipment (UE), downlink control information (DCI) for indicating relevant information of physical downlink control channel (PDCCH) monitoring.

According to an embodiment, the method may include based on the relevant information of PDCCH monitoring, transmitting or not transmitting PDCCH to the UE.

According to an embodiment, an electronic equipment may be provided.

According to an embodiment, the electronic equipment may include: a transceiver, configured to transmit and receive signals; and a processor, coupled with the transceiver and configured to perform operations.

According to an embodiment, the operations may include: receiving configuration information of periodical physical downlink control channel (PDCCH) monitoring, wherein each cycle of the configuration information comprises a first time window and/or a second time window; and according to the configuration information, performing PDCCH monitoring on type 3 common search space (CSS) and UE-specific search space (USS) in the first time window, and/or, skipping PDCCH monitoring on type 3 CSS and USS in the second time window.

According to an embodiment, one or more non-transitory computer-readable storage media may be provided. The one or more non-transitory computer-readable storage media may stores computer-executable instructions that, when executed by at least one processor of a user equipment (UE), configure the UE to perform operations.

According to an embodiment, the operations may include: receiving configuration information of periodical physical downlink control channel (PDCCH) monitoring, wherein each cycle of the configuration information comprises a first time window and/or a second time window; and according to the configuration information, performing PDCCH monitoring on type 3 common search space (CSS) and UE-specific search space (USS) in the first time window, and/or, skipping PDCCH monitoring on type 3 CSS and USS in the second time window.

Figure 13:
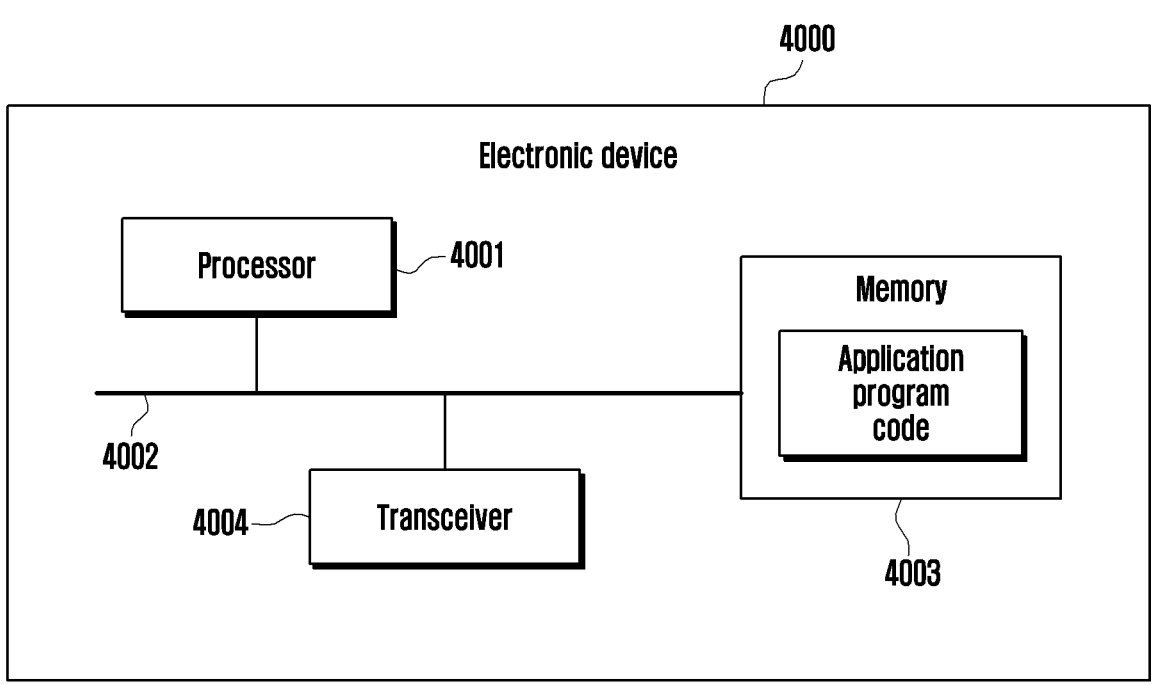
FIG. 13 is a schematic diagram of a structure of an electronic equipment according to an embodiment of the disclosure.

FIG. 13 illustrates a schematic diagram of a structure of an electronic equipment according to an embodiment of the disclosure.

Referring to FIG. 13, an electronic equipment 4000 includes a processor 4001 and a memory 4003. The processor 4301 is connected to the memory 4003, for example, via a bus 4002. Optionally, the electronic equipment 4000 may further include a transceiver 4004. The transceiver 4004 may be configured for data interaction between the electronic equipment and other electronic equipments, for example, transmitting data and/or receiving data, or the like. It is to be noted that, in practical applications, the number of the transceiver 4004 is not limited to one, and the structure of the electronic equipment 4000 does not constitute any limitation to the embodiments of the disclosure. Optionally, the electrical device can be a first network node, a second network node, or the third network node.

The processor 4001 may be a central processing unit (CPU), a general-purpose processor, a digital signal processor (DSP), an application specific integrated circuit (ASIC), or a field programmable gate array (FPGA), or other programmable logic devices, transistor logic devices, hardware components, or any combination thereof. It may implement or execute various logical blocks, modules and circuits described in connection with the disclosure. The processor 4001 may also be a combination for realizing computing functions, for example, a combination of one or more microprocessors, a combination of a DSP and a microprocessor, or the like.

The bus 4002 may include a path to transfer information between the components described above. The bus 4002 may be a peripheral component interconnect (PCI) bus, or an extended industry standard architecture (EISA) bus, or the like. The bus 4002 may be an address bus, a data bus, a control bus, or the like. For ease of presentation, the bus is represented by only one thick line in FIG. 13. However, it does not mean that there is only one bus or one type of buses.

The memory 4003 may be read only memories (ROMs) or other types of static storage devices that can store static information and instructions, random access memories (RAMs) or other types of dynamic storage devices that can store information and instructions, may be electrically erasable programmable read only memories (EEPROMs), compact disc read only memories (CD-ROMs) or other optical disk storages, optical disc storages (including compact discs, laser discs, discs, digital versatile discs, blue-ray discs, or the like), magnetic storage media or other magnetic storage devices, or any other media that can carry or store desired program codes in the form of instructions or data structures and that can be accessed by computers.

The memory 4003 is used to store application program codes for executing the embodiment of the disclosure, and is controlled by the processor 4001. The processor 4001 is used to execute the application program codes stored in the memory 4003 to implement the step shown in the foregoing method embodiment.

Embodiments of the disclosure provide a computer-readable storage medium having a computer program stored on the computer-readable storage medium, the computer program, when executed by a processor, implements the steps and corresponding contents of the foregoing method embodiments.

Embodiments of the disclosure also provide a computer program product including a computer program, the computer program when executed by a processor realizing the steps and corresponding contents of the preceding method embodiments.

The terms "first", "second", "third", "fourth", "1", "2", or the like, (if present) in the specification and claims of this application and the accompanying drawings above are used to distinguish similar objects and need not be used to describe a particular order or sequence. It should be understood that the data so used is interchangeable where appropriate so that embodiments of the disclosure described herein can be implemented in an order other than that illustrated or described in the text.

It should be understood that while the flow diagrams of embodiments of the disclosure indicate the individual operational steps by arrows, the order in which these steps are performed is not limited to the order indicated by the arrows. Unless explicitly stated herein, in some implementation scenarios of embodiments of the disclosure, the implementation steps in the respective flowcharts may be performed in other orders as desired. In addition, some, or all of the steps in each flowchart may include multiple sub-steps or multiple phases based on the actual implementation scenario. Some or all of these sub-steps or stages can be executed at the same moment, and each of these sub-steps or stages can also be executed at different moments separately. The order of execution of these sub-steps or stages can be flexibly configured according to requirements in different scenarios of execution time, and the embodiments of the disclosure are not limited thereto.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a communication system, the method comprising:
   receiving, via radio resource control (RRC) signaling, configuration information of periodical physical downlink control channel (PDCCH) monitoring, wherein the configuration information comprises information on a first time window and information on a second time window, and wherein the first time window corresponds a time window in which the periodical PDCCH monitoring is performed and the second time window corresponds to a time window in which the periodical PDCCH monitoring is skipped;
   performing the periodical PDCCH monitoring on type 3 common search space (CSS) and UE-specific search space (USS) in the first time window;
   skipping the periodical PDCCH monitoring on type 3 CSS and USS in the second time window;
   receiving downlink control information (DCI) for deactivating the configuration information;
   after receiving the DCI:
      stopping the performing of the periodical PDCCH monitoring in the first time window; and
      stopping the skipping of the periodical PDCCH monitoring in the second time window.

2. The method of claim 1, wherein the configuration information includes at least one of:
   a period;
   a length of the first time window;
   a length of the second time window;
   a starting position of the first time window; or
   a starting position of the second time window.

3. The method of claim 1, wherein the receiving of the configuration information of periodical PDCCH monitoring includes at least one of:
   receiving UE-specific RRC signaling for indicating the configuration information; or
   receiving UE-specific RRC signaling for indicating the configuration information, and receiving DCI for activating the configuration information, wherein a starting position of the first time window or the second time window is a position of a first preset interval after a corresponding DCI has been received.

4. The method of claim 1,
   wherein the receiving of the configuration information of periodical PDCCH monitoring includes receiving at least two pieces of configuration information of periodical PDCCH monitoring, and
   wherein at least one of the performing of the periodical PDCCH monitoring on type 3 CSS and USS or the skipping of the periodical PDCCH monitoring on type 3 CSS and USS is based on the at least two pieces of configuration information.

5. The method of claim 4, wherein at least one of the following is satisfied:
   in case that at least one configuration of at least two configurations is in the first time window, the periodical PDCCH monitoring is performed; or in case that the at least two configurations are both in the second time window, the periodical PDCCH monitoring is skipped.

6. The method of claim 4, wherein the at least two pieces of configuration information are respectively employed for one of:

different data services;

different service cells, wherein the at least two pieces of configuration information respectively include index numbers of corresponding service cells;

different service cell groups, wherein the at least two pieces of configuration information respectively include index numbers of corresponding service cell groups;

different search spaces, wherein the at least two pieces of configuration information respectively include index numbers of corresponding search spaces;

different search space groups, wherein the at least two pieces of configuration information respectively include index numbers of corresponding search space groups; or at least one of type 1 CSS, type 2 CSS, type 3 CSS, and USS.

7. A user equipment (UE) in a communication system, the UE comprising:

a transceiver; and a processor coupled with the transceiver and configured to:

receive, via radio resource control (RRC) signaling, configuration information of periodical physical downlink control channel (PDCCH) monitoring, wherein the configuration information comprises information on a first time window and information on a second time window, and wherein the first time window corresponds a time window in which the periodical PDCCH monitoring is performed and the second time window corresponds to a time window in which the periodical PDCCH monitoring is skipped;

perform the periodical PDCCH monitoring on type 3 common search space (CSS) and UE-specific search space (USS) in the first time window;

skip the periodical PDCCH monitoring on type 3 CSS and USS in the second time window;

receive downlink control information (DCI) for deactivating the configuration information;

after receiving the DCI:

stop the performing of the periodical PDCCH monitoring in the first time window; and stop the skipping of the periodical PDCCH monitoring in the second time window.

8. The UE of claim 7, wherein the configuration information includes at least one of:

a period;

a length of the first time window;

a length of the second time window;

a starting position of the first time window; or a starting position of the second time window.

9. The UE of claim 7, wherein the processor is further configured to perform at least one of:

receiving UE-specific RRC signaling for indicating the configuration information; or receiving UE-specific RRC signaling for indicating the configuration information, and receiving DCI for activating the configuration information, wherein a starting position of the first time window or the second time window is a position of a first preset interval after a corresponding DCI has been received.

10. The UE of claim 7, wherein the processor is further configured to perform receiving at least two pieces of configuration information of periodical PDCCH monitoring, and wherein at least one of the performing of the periodical PDCCH monitoring on type 3 CSS and USS or the skipping of the periodical PDCCH monitoring on type 3 CSS and USS is based on the at least two pieces of configuration information.

11. The UE of claim 10, wherein at least one of the following is satisfied:

in case that at least one configuration of at least two configurations is in the first time window, the periodical PDCCH monitoring is performed; or in case that the at least two configurations are both in the second time window, the periodical PDCCH monitoring is skipped.

12. The UE of claim 10, wherein the at least two pieces of configuration information are respectively employed for one of:

different data services;

different service cells, wherein the at least two pieces of configuration information respectively include index numbers of corresponding service cells;

different service cell groups, wherein the at least two pieces of configuration information respectively include index numbers of corresponding service cell groups;

different search spaces, wherein the at least two pieces of configuration information respectively include index numbers of corresponding search spaces;

different search space groups, wherein the at least two pieces of configuration information respectively include index numbers of corresponding search space groups; or at least one of type 1 CSS, type 2 CSS, type 3 CSS, and USS.

13. A method performed by a base station in a communication system, the method comprising:

transmitting, to user equipment (UE) via radio resource control (RRC) signaling, configuration information of periodical physical downlink control channel (PDCCH) transmission, wherein the configuration information comprises information on a first time window and information on a second time window, and wherein the first time window corresponds a time window in which the periodical PDCCH transmission is performed and the second time window corresponds to a time window in which the periodical PDCCH transmission is skipped; and performing the periodical PDCCH transmission to the UE on type 3 common search space (CSS) and UE-specific search space (USS) of the UE in the first time window;

skipping the periodical PDCCH transmission to the UE on type 3 CSS and USS in the second time window transmitting, to the UE, downlink control information (DCI) for deactivating the configuration information;

after transmitting the DCI:

stopping performing of the periodical PDCCH transmission in the first time window; and stopping the skipping of the periodical PDCCH transmission in the second time window.

14. The method of claim 13, wherein the configuration information includes at least one of:

a period;

a length of the first time window;

a length of the second time window;

a starting position of the first time window; or a starting position of the second time window.

15. The method of claim 13, wherein the transmitting of the configuration information of periodical PDCCH monitoring includes at least one of:

transmitting, to the UE, UE-specific RRC signaling for indicating the configuration information; or transmitting, to the UE, UE-specific RRC signaling for indicating the configuration information, and transmitting, to the UE, DCI for activating the configuration information, wherein a starting position of the first time window or the second time window is a position of a first preset interval after a corresponding DCI has been transmitted.

16. The method of claim 13, wherein the transmitting of the configuration information of periodical PDCCH monitoring includes transmitting at least two pieces of configuration information of periodical PDCCH monitoring, and wherein at least one of the performing of the periodical PDCCH transmission on type 3 CSS and USS or the skipping of the periodical PDCCH transmission on type 3 CSS and USS is based on the at least two pieces of configuration information.

17. A base station in a communication system, the base station comprising:

a transceiver; and a processor coupled with the transceiver and configured to:

transmit, to user equipment (UE) via radio resource control (RRC) signaling, configuration information of periodical physical downlink control channel (PDCCH) transmission, wherein the configuration information comprises information on a first time window and information on a second time window, and wherein the first time window corresponds a time window in which the periodical PDCCH transmission is performed and the second time window corresponds to a time window in which the periodical PDCCH transmission is skipped; and perform the periodical PDCCH transmission to the UE on type 3 common search space (CSS) and UE-specific search space (USS) of the UE in the first time window;

skip the periodical PDCCH transmission to the UE on type 3 CSS and USS in the second time window transmit, to the UE, downlink control information (DCI) for deactivating the configuration information;

after transmitting the DCI:

stop performing of the periodical PDCCH transmission in the first time window; and stop the skipping of the periodical PDCCH transmission in the second time window.

18. The base station of claim 17, wherein the configuration information includes at least one of:

a period;

a length of the first time window;

a length of the second time window;

a starting position of the first time window; or a starting position of the second time window.

19. The base station of claim 17, wherein the processor is further configured to perform at least one of:

transmitting, to the UE, UE-specific RRC signaling for indicating the configuration information; or transmitting, to the UE, UE-specific RRC signaling for indicating the configuration information, and transmitting, to the UE, DCI for activating the configuration information, wherein a starting position of the first time window or the second time window is a position of a first preset interval after a corresponding DCI has been transmitted.

20. The base station of claim 17, wherein the processor is further configured to transmit at least two pieces of configuration information of periodical PDCCH monitoring, and wherein at least one of the performing of the periodical PDCCH transmission on type 3 CSS and USS or the skipping of the periodical PDCCH transmission on type 3 CSS and USS is based on the at least two pieces of configuration information.

* * * * *